US006501074B1

(12) United States Patent
Gentry et al.

(10) Patent No.: US 6,501,074 B1
(45) Date of Patent: Dec. 31, 2002

(54) DOUBLE-FOCUSING MASS SPECTROMETER APPARATUS AND METHODS REGARDING SAME

(75) Inventors: W. Ronald Gentry; Clayton F. Giese; Jorge A. Diaz-Diaz, all of Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/421,786

(22) Filed: Oct. 19, 1999

(51) Int. Cl.[7] .......................... B01D 59/44; H01J 49/00

(52) U.S. Cl. ...................... 250/296; 250/281; 250/288; 250/290; 250/293

(58) Field of Search ................................ 250/310, 306, 250/297, 296, 281, 288, 290, 293, 298

(56) References Cited

U.S. PATENT DOCUMENTS

| | | | |
|---|---|---|---|
| 3,944,827 A | | 3/1976 | Matsuda |
| 3,984,682 A | | 10/1976 | Matsuda |
| 4,054,796 A | | 10/1977 | Naito |
| 4,418,280 A | | 11/1983 | Matsuda |
| 4,727,249 A | | 2/1988 | Bateman et al. |
| 4,924,090 A | * | 5/1990 | Wollnik et al. ............. 250/296 |
| 5,118,939 A | | 6/1992 | Ishihara |
| 5,198,666 A | | 3/1993 | Bateman |
| 5,317,151 A | | 5/1994 | Sinha et al. |
| 5,386,115 A | | 1/1995 | Freidhoff et al. |
| 5,401,963 A | | 3/1995 | Sittler |
| 5,536,939 A | | 7/1996 | Freidhoff et al. |
| 5,541,408 A | | 7/1996 | Sittler |
| 5,614,711 A | | 3/1997 | Li et al. |

* cited by examiner

*Primary Examiner*—John R. Lee
*Assistant Examiner*—Kalimah Fernandez
(74) *Attorney, Agent, or Firm*—Mueting, Raasch & Gebhardt, P.A.

(57) ABSTRACT

A double-focusing mass spectrometer apparatus includes a first cylindrical sector electrode defined at a first radial distance from a axis with the first cylindrical sector electrode having an upper and lower edge and a second cylindrical sector electrode surface defined at a second radial distance from the axis with the second cylindrical sector electrode having an upper and lower edge corresponding to the upper and lower edge of the first cylindrical sector electrode. An ion path is defined between the first and second cylindrical sector electrodes. A first magnet pole and a second magnet pole are positioned proximate the upper and lower edges of the first and second cylindrical sector electrodes, respectively, for providing a magnetic field in the ion path. A first and second array of electrodes, e.g., cylindrical segment electrodes, are positioned between the upper edges and lower edges of the first and second cylindrical sector electrodes, respectively, for use with the first and second cylindrical sector electrodes to provide a desired electric field in the ion path perpendicular to the magnetic field. In one configuration, the first and second cylindrical sector electrodes may not be required to provided the desired electric field but the electric field may be provided by the arrays of electrodes alone. Generally, the electrode arrays can be configured in a number of ways with application of appropriate voltages to attain the desired electric field, e.g., electrodes evenly spaced between the upper edges of the first and second cylindrical sector electrodes and electrodes evenly spaced between the lower edges of the first and second cylindrical sector electrodes with a predetermined voltage applied that varies logarithmically across the first and second arrays of electrodes. Methods for use in double focusing mass spectrometry are also provided, e.g., methods to provide the above apparatus.

50 Claims, 13 Drawing Sheets

*Fig. 11A*
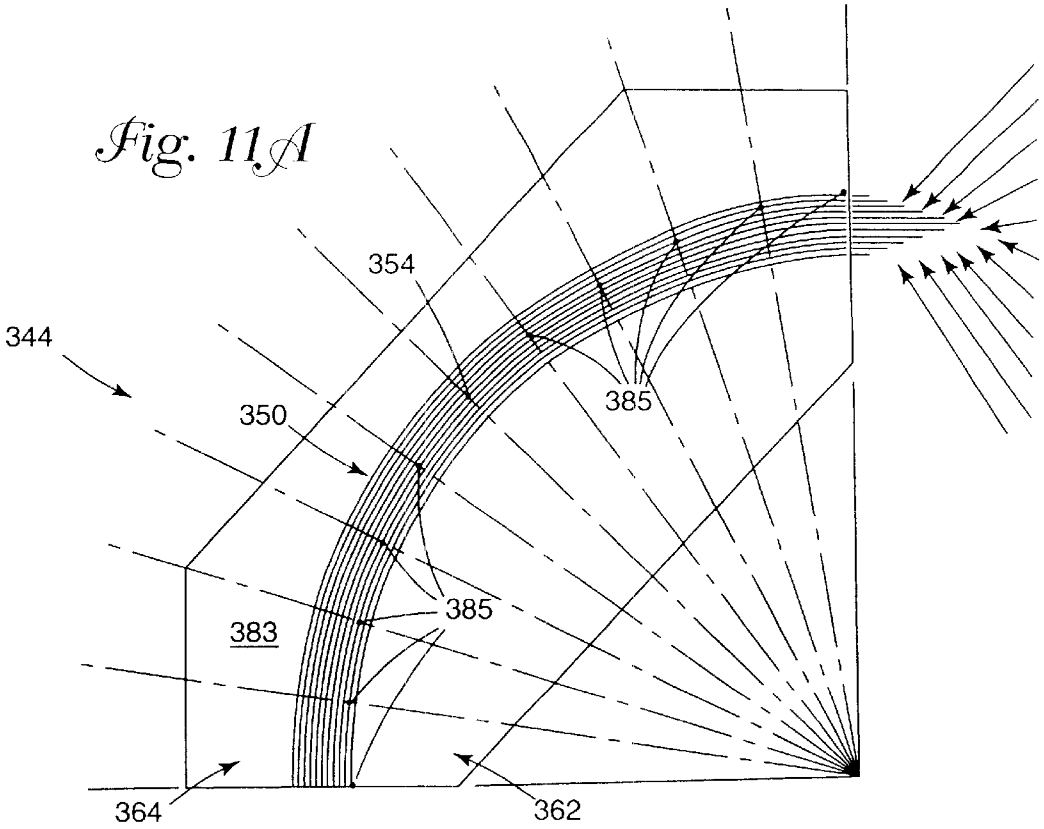
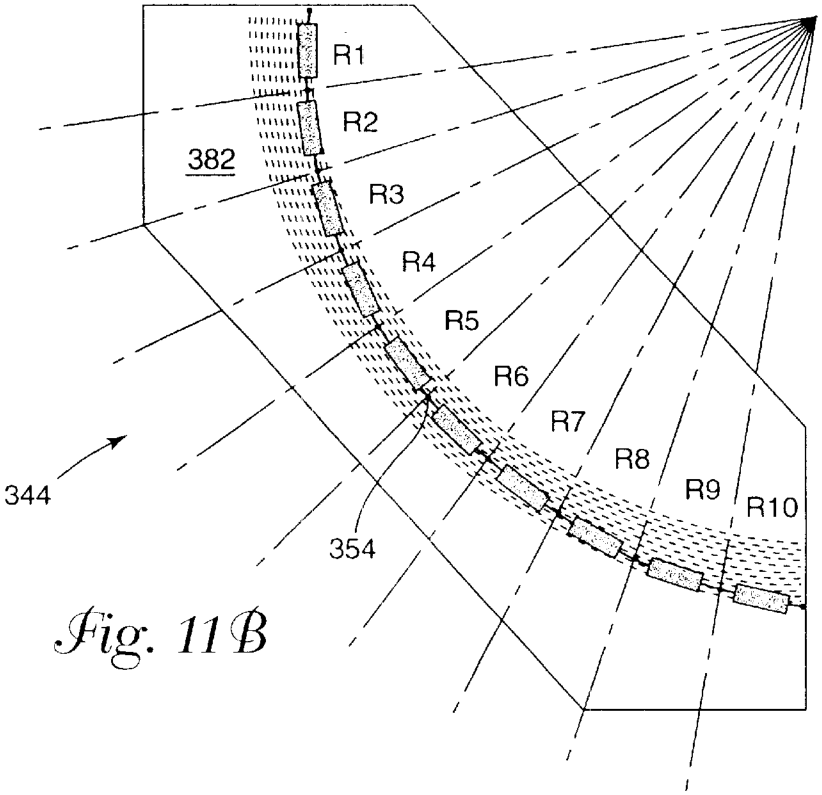
*Fig. 11B*

DOUBLE-FOCUSING MASS SPECTROMETER APPARATUS AND METHODS REGARDING SAME

FIELD OF THE INVENTION

The present invention relates to mass spectrometers, e.g., compact miniature mass spectrometers, for use in chemical analysis of samples. More particularly, the present invention pertains to mass spectrometers employing superimposed magnetic and electric fields.

BACKGROUND OF THE INVENTION

Various types of mass spectrometers are being used in the field of chemical analysis and related fields. For example, such mass spectrometers may include deflecting type mass spectrometers in which the ions constituting the ion beam are separated by a magnetic field according to their mass to charge (m/e) ratio. Deflecting-type mass spectrometers can broadly be classified into two categories, single-focusing and double-focusing mass spectrometers, according to the type of ion beam optical system employed. In the single focus category, directional focusing but not velocity focusing is possible, and in the double focus category, both directional and velocity focusing are possible.

In the past, generally, in conventional types of double-focusing mass spectrometers, the electric field and magnetic field used for deflection were arranged separately. However, in U.S. Pat. No. 3,984,682 to Matsuda, entitled "Mass Spectrometer With Superimposed Electric and Magnetic Fields," issued Oct. 5, 1976, a mass spectrometer employing superimposed electric and magnetic fields arranged substantially at right angles to one another is described. As described in Matsuda, if the electric field of the superimposed fields is swept and the magnetic field of the superimposed fields is kept fixed, ions having different m/e ratios will satisfy the double focusing condition, and therefore, the ions can be collected at a detector. In such a case, the ratio of the voltage applied for establishing the electric field strength and the accelerating voltage must be kept constant during the sweeping of the electric field. Matsuda arranges cylindrical electrodes between magnetic poles such that the electric field of the device is perpendicular to the magnetic field to provide suitable x-y focusing. Further, in addition, auxiliary electrodes are arranged symmetrically above and below the cylindrical electrodes. Voltages corresponding to those applied to the cylindrical electrodes are applied to the auxiliary electrodes to control the shape of the electric field, particularly for controlling z-direction focusing. It is recognized in Matsuda that in the case of superimposed fields with the cylindrical electrodes arranged between the magnetic poles, that consideration must be given to the size of the cylindrical electrodes. In Matsuda, the ideal ratio of the distance between the cylindrical electrodes and their height is 1:2. However, having cylindrical electrodes of such a height adds to the size of the overall device and further decreases a desirably high magnetic field between the poles, i.e., the magnetic field decreasing as the height of cylindrical electrodes increases and the gap between the magnetic poles is increased.

Another mass spectrometer employing superimposed magnetic and electric fields is described in U.S. Pat. No. 4,054,796 to Naito, entitled "Mass Spectrometer With Superimposed Electric And Magnetic Fields," issued Oct. 18, 1977. U.S. Pat. No. 4,054,796 describes the use of superimposed electric and magnetic fields arranged substantially at right angles. In U.S. Pat. No. 4,054,796, electrodes having concentric cylindrically shaped curved surfaces are used to form the electric field of the superimposed magnetic and electric fields, while magnetic pole pieces form a magnetic field perpendicular to this electric field. The superimposed fields are provided in an ion path in an airtight throughway. At one end of the ion path is an ionization chamber for providing an ionized specimen to the ion path. Electrodes producing a constant accelerating voltage (as opposed to a varying accelerating voltage as described in Matsuda) draw the ionized specimen into the ionization chamber in an ion path in which the superimposed fields are formed. At the other end of the ion path is an ion collector. The ions introduced into the superimposed fields in the ion path are deflected according to their mass to charge (m/e) ratios with such deflected ions being detected by the ion collector. In this mass spectrometer, the central orbit of the ion beam in the ion path (that is, the orbit of the ions of mass to charge ratio being detected) is located on an equipotential surface of the electric field. The intensity of the electric field in the ion path is swept (i.e., voltage on the cylindrical electrodes is varied) to change the mass to charge ratio of the ions traveling the central orbit. However, such sweeping of the electric field when the accelerating voltage is kept constant, is accompanied by an undesirable shift in the focusing position of the ion beam. The change in focusing position is compensated by a variety of techniques. For example, such compensation may be achieved by auxiliary electrodes placed above and below the curved surface electrodes. The voltage on the auxiliary electrode is varied as a function of the voltage applied to the curved surface electrodes.

Such existing mass spectrometers as described above are generally constructed in whole or in part with discrete metal electrodes and insulators assembled inside of a metal vacuum envelope. Due to such construction, the size of such existing mass spectrometers is generally large and the cost of such mass spectrometers prohibits their use for various functions, e.g., environmental monitoring, bedside patient care in hospitals, battlefield chemical and biological agent detection, chemical plant process control, etc.

Further, generally, as described above, one way of obtaining superimposed electric and magnetic fields is with the use of two cylindrical electrodes having the same cylinder axis, but different radii. If the axial height of these electrodes is much larger than the spacing between them, then the field near the center of the electrodes will have suitable geometry. However, many mass spectrometers require that there be a high magnetic field along the direction of the cylindrical axis which limits the spacing between the poles, i.e., pole gap, for creating such a high magnetic field. Therefore, the axial height of the cylindrical electrodes is limited by the small spacing between the poles of the permanent magnet for generating such a high magnetic field. Due to, at least in part, the limited axial height of such cylindrical electrodes, the electric field geometry near the top and bottom edges of the cylindrical electrodes is generally not the correct and desirable geometry. This is particularly the case when the electric field must be maintained at a particular ratio with the magnetic field in such mass spectrometers employing superimposed magnetic and electric fields.

In addition, mass spectrometers which employ superimposed magnetic and electric fields in an ion path assume that the magnetic field is perfectly homogenous within the boundaries of the magnet poles and zero outside those boundaries. However, it is virtually impossible to construct a magnet with this ideal field. In practice, there is always a fringing field which exists beyond the pole boundaries. Further, there is usually a significant inhomogeneity of the magnetic field inside the pole boundaries, unless a substantial cost is outlaid for producing a magnet which is substantially homogenous. For example, the field may vary within the pole boundaries in the range of about 10% of the average field therein. Due to such magnetic field inhomogeneity, resolution of mass spectrometers having superimposed magnetic and electric fields is significantly affected as the ratio of magnetic and electric fields is not consistently correct along the ion path.

SUMMARY OF THE INVENTION

There is a need in the art for improved mass spectrometer apparatus having superimposed magnetic and electric fields and methods regarding such spectrometer apparatus which reduce the effects of the problems described above. The present invention which may be compact and miniature in size compared to conventional spectrometers overcomes the problems described above and other problems as will become apparent to one skilled in the art from the detailed description below. Further, the mass spectrometer according to the present invention may be part of a portable analysis instrument, e.g., an in situ analysis device.

A double focusing mass spectrometer apparatus according to the present invention includes a first cylindrical sector electrode surface defined at a first radial distance from a cylindrical axis with the first cylindrical sector electrode surface having an upper and lower edge and also includes a second cylindrical sector electrode surface defined at a second radial distance from the cylindrical axis with the second cylindrical sector electrode having an upper and lower edge corresponding to the upper and lower edge of the first cylindrical sector electrode. An ion path is defined between the first and second cylindrical sector electrode surfaces. A first magnet pole and a second magnet pole are positioned proximate the upper and lower edges of the first and second cylindrical sector electrode surfaces, respectively, for providing a magnetic field in the ion path. A first array of electrodes is positioned between the upper edges of the first and second cylindrical sector surfaces and a second array of electrodes is positioned between the lower edges of the first and second cylindrical sector surfaces for use with the first and second cylindrical sector electrode surfaces to provide a desired electric field in the ion path perpendicular to the magnetic field.

In one embodiment of the apparatus, a ratio of a length of the first and second cylindrical sector electrode surfaces between the upper and lower edges in the direction of the cylindrical axis to the distance between the first and second cylindrical sector electrode surfaces is in the range of about 0.1 to about 1.5.

In another embodiment of the apparatus, the first array of electrodes includes at least two electrodes evenly spaced between the upper edges of the first and second cylindrical sector electrode surfaces. Further, the second array of electrodes includes at least two electrodes evenly spaced between the lower edges of the first and second cylindrical sector electrode surfaces. The embodiment of the apparatus further includes a voltage supply circuit for applying a predetermined voltage that varies logarithmically across the first and second array of electrodes.

In another embodiment of the apparatus, the first array of electrodes includes at least two electrodes logarithmically spaced between the upper edges of the first and second cylindrical sector electrode surfaces. Further, the second array of electrodes includes at least two electrodes logarithmically spaced between the lower edges of the first and second cylindrical sector electrode surfaces. This embodiment of the apparatus then includes a voltage supply circuit for applying a predetermined voltage to each of the first and second cylindrical sector electrode surfaces and to each of the electrodes of the first and second electrode arrays, e.g., via a voltage divider network of equally valued resistors.

In yet another embodiment of the apparatus, the first and second arrays of electrodes are configured as a function of the magnetic field such that a desired ratio of magnetic field to electric field is attained in substantially the entire ion path.

Another double focusing mass spectrometer apparatus according to the present invention includes two or more substrate portions positioned to define an ion path having superimposed magnetic and electric fields provided therein. A first substrate portion includes a first array of electrodes formed on one side thereof and a second substrate portion includes a second array of electrodes formed on a side thereof. The first and second arrays of electrodes are positioned generally parallel to one another for use in providing the electric field in the ion path. Further, the apparatus includes a first and second magnet pole located proximate the two or more substrate portions for providing the magnetic field in the ion path orthogonal to the electric field.

In one embodiment of the apparatus, a distance between the parallel first and second arrays of circular segment electrodes is less than about 0.1 times a radial dimension along which the parallel first and second circular segment electrode arrays are defined.

In a double focusing mass spectrometry method according to the present invention, the method includes providing a first cylindrical sector electrode surface defined at a first radial distance from a cylindrical axis with the first cylindrical sector electrode surface having an upper and lower edge and includes providing a second cylindrical sector electrode surface defined at a second radial distance from the cylindrical axis with the second cylindrical sector electrode having an upper and lower edge corresponding to the upper and lower edge of the first cylindrical sector electrode. An ion path is defined between the first and second cylindrical sector electrode surfaces. Thereafter, a magnetic field is generated in the ion path and a desired electric field is generated in the ion path perpendicular to the magnetic field using a first array of electrodes positioned between the upper edges of the first and second cylindrical sector surfaces, a second array of electrodes positioned between the lower edges of the first and second cylindrical sector surfaces, and the first and second cylindrical sector electrode surfaces.

In another method for use in double focusing mass spectrometer apparatus, the method includes providing a non-uniform magnetic field for an ion path of a double focusing mass spectrometer. An electrode assembly is formed to provide an electric field in the ion path. The forming of the electrode assembly includes forming two or more electrodes to a particular configuration as a function of the non-uniformity of the magnetic field such that the electric field in the entire ion path in the double focused mass spectrometer is at a predetermined ratio to the magnetic field.

In one embodiment of the method, forming the two or more electrodes includes configuring a first and second array of electrodes positioned generally parallel to one another as a function of the non-uniformity of the magnetic field, e.g., spacing and/or shaping electrodes of the first and second array of electrodes as a function of the non-uniformity of the magnetic field.

In yet another method of a double focusing mass spectrometry method according to the present invention, the method includes sealing two or more substrate portions together to define an ion path. A first substrate portion includes a first array of electrodes formed on a side thereof and a second substrate portion includes a second array of electrodes formed on a side thereof. The sealing of the two or more substrate portions together includes positioning the first and second arrays of electrodes generally parallel to one another. Thereafter, an electric field is generated in the ion path using at least the first and second arrays of electrodes. The electric field has a cylindrical geometry. Further, the method includes positioning a first and second magnet pole proximate the two or more substrate portions for providing a magnetic field in the ion path orthogonal to and superimposed with the electric field in the ion path.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIGS. 11A and 11B are top and bottom views of one cylindrical electrode cap plate forming a portion of an electrode configuration for the double-focusing mass spectrometer apparatus of FIG. 8.

DETAILED DESCRIPTION OF THE EMBODIMENTS

The present invention shall be generally described with reference to FIGS. 1–2. Thereafter, various embodiments of the present invention shall be described further with reference to FIGS. 3–12. It will become apparent to one skilled in the art that elements from one embodiment may be used in combination with elements of the other embodiments and that the present invention is not limited to the specific embodiments described herein but only as described in the accompanying claims.

The present invention is directed to a double-focusing mass spectrometer apparatus and methods regarding such an apparatus. Using one or more of the techniques or concepts described herein, a small, lightweight, and possibly battery-powered mass spectrometer apparatus may be constructed. For example, such a mass spectrometer may be hand-held and could be used for a wide variety of applications. Samples are preferably introduced in the gas phase, although it may also be possible to use the concepts described herein in a spectrometer wherein the samples are introduced in the liquid phase. Such a double-focusing mass spectrometer provides functionality in a mass range of about 1 (atomic mass unit) amu to about 200 amu with a resolution as low as 1 amu. Further, for example, the size of such a mass spectrometer is preferably about 100 $cm^3$ or less.

Figure 1:
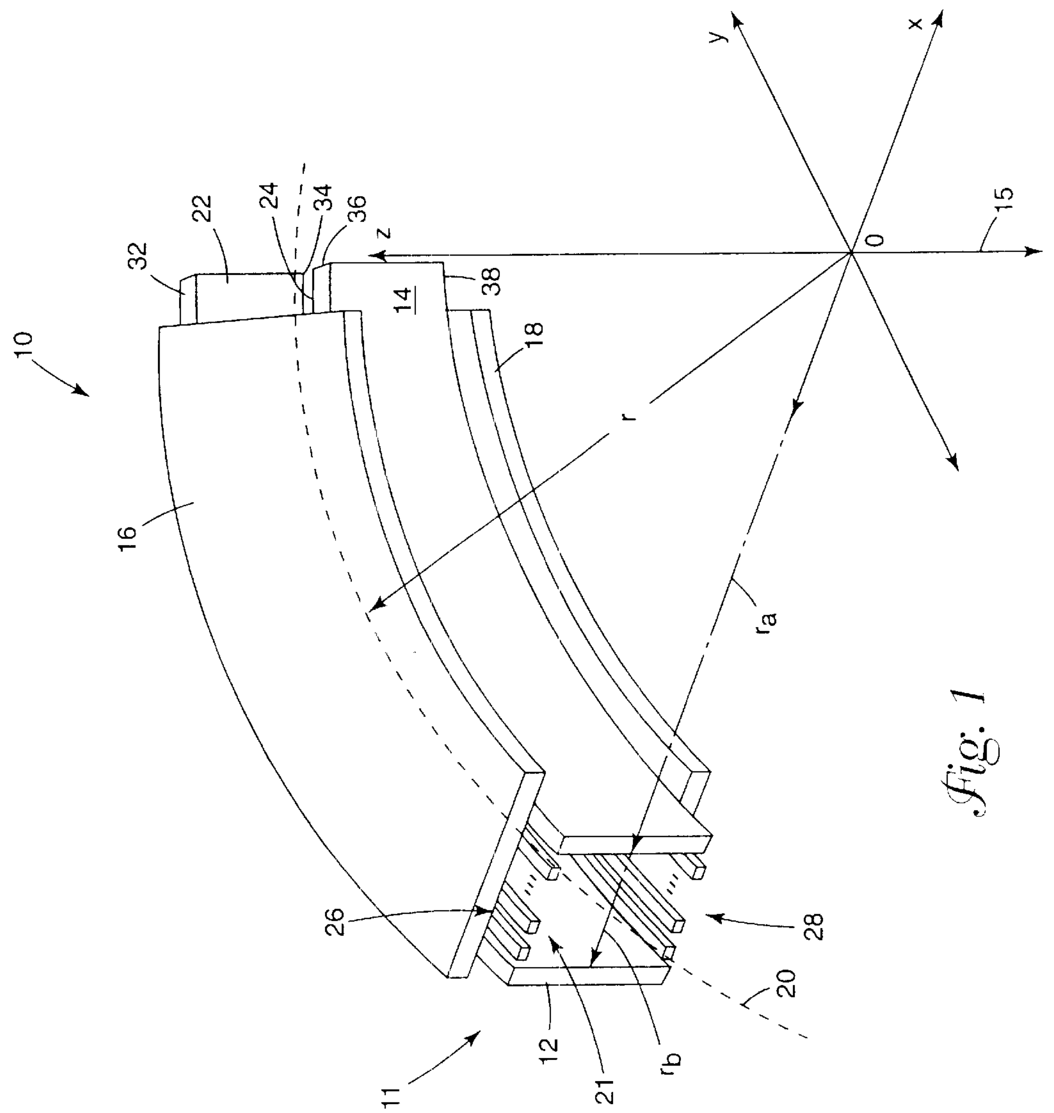
FIG. 1 is a graphical illustration generally showing an analyzer region for a double-focusing mass spectrometer including superimposed magnetic and electrical fields in an ion path according to the present invention.
Figure 2:
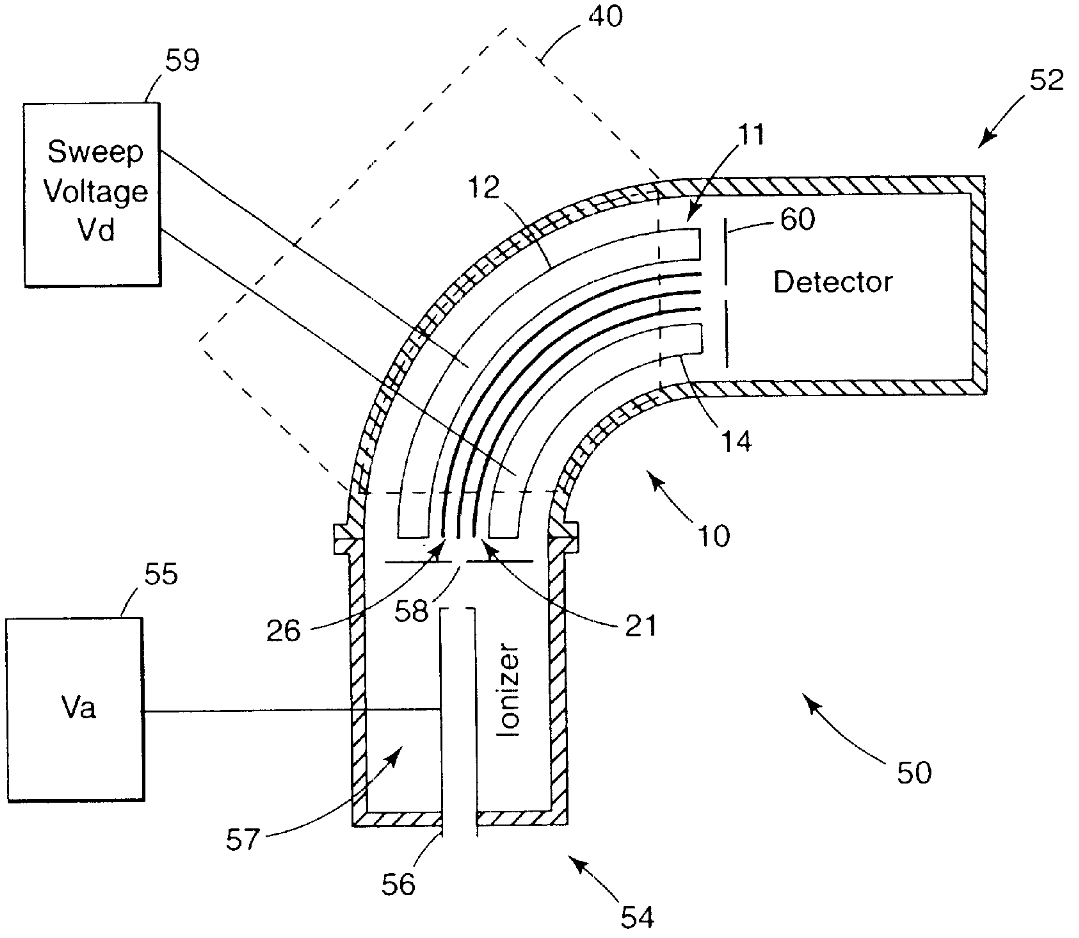
FIG. 2 is one illustrative embodiment of a double-focusing mass spectrometer apparatus according to the present invention including an analyzer region as shown in FIG. 1.

Generally, as shown in FIG. 2, the double-focusing mass spectrometer apparatus 50 includes an ion source or ionizer 54 for providing an ion beam and an analyzer region 10, as shown in further detail in FIG. 1, wherein the trajectory of ionized atoms and molecules of the ion beam emerging from the ion source or ionizer 54 is influenced by the superimposed electrical and magnetic fields provided in ion path 21. Once the ion beam is dispersed by the mass analyzer region 10 in its respective mass to charge ratios (m/e), the ions are collected and counted by an ion collector or detector 52 of the double-focusing mass spectrometer apparatus 50. Subsequently, different electronic components and/or computer software give rise to the mass spectrum resulting from the collected ions as is known to those skilled in the art. The present invention focuses particularly on the analyzer region 10 of the double-focusing mass spectrometer apparatus 50 in which the superimposed magnetic and electrical fields are provided for influencing the trajectory of ionized atoms and molecules. As such, the ionizer 54 and the detector 52 may be any ionizer and/or detector generally used in double-focusing mass spectrometry or any other deflection-type mass spectrometry.

Various ionization methods are available and can be used. For example, the ionizer 54 may include electron impact ionization, chemical ionization, field desorption ionization, field ionization, fast atom bombardment, secondary ion bombardment, atmospheric pressure chemical ionization, electrospray ionization, and matrix-assisted desorption ionization. Preferably, particularly for gases, volatile compounds, and metallic vapors, electron impact ionization is used. Ion production by electron impact ionization, also known as electron bombardment ionization, generally, as shown in FIG. 2, involves the introduction of a sample into an ionization chamber 57 via a small aperture 56. Generally, electrons are emitted typically using a filament and directed perpendicular to the trajectory of the neutral particles of the sample. Upon ionization, the ions are drawn out from inside the ionization chamber by an extractor electrode. The ions are then focused by additional electrodes and accelerated through the superimposed fields in the analyzer region 10 by an accelerating voltage (Va) applied by accelerating voltage (Va) source 55. Further, a collimating slit, shown generally as 58 in FIG. 2, provides for entry of the ions into ion path 21 of analyzer region 10.

Various components and electrode configurations may be used for providing such ionization, and the ionization is not limited to any particular ionizer configuration. For example, one or more field emission tip electrodes may be used for providing electrons as opposed to using a filament. Focusing is necessary to concentrate the beam into the small entrance to the analyzer region 10 as well as to minimize spread. Further, collimating is done by rejecting those ions that failed to focus due to large spread angles with the collimating slit 58. This exit slit 58 also serves as the interface between the ionizer 54 and the analyzer region 10. Both focusing and collimation of the ions are used for achieving a good resolution in the analyzer region 10. Preferably, the ion source 54 provides z-focusing of the ions in the analyzer region 10, e.g., such as by the ion source configuration and the applied accelerating voltage.

Once collimated, the ions enter an ion path 21 of the analyzer region 10 to be separated in their respective mass to charge ratios (m/e) as the electric field of the superimposed magnetic and electric fields is swept by application of a varying electrode voltage (Vd) applied to the electrode configuration 11 by sweep voltage source (Vd) 59 to generate the electric field of the superimposed fields. Any technique of sweeping the voltage may be used. For example, a sweep signal generator and a variable voltage source controlled thereby may be used. According to the present invention, double-focusing is used to provide for the separation of ions using a superimposed magnetic and electric field in the ion path wherein the magnetic force on the selected ion is double the electric force on the selected ion, and in the opposite direction, as further described below, preferably throughout the entire ion path 21. As the electric field of the superimposed fields is swept and the magnetic field is kept fixed, the double focusing condition for ions having different m/e ratios will be satisfied so that detection is possible. Of course, the ratio of the voltage (Vd) applied for establishing the electric field strength and the accelerating voltage (Va) must be kept constant during the sweeping of the electric field.

Once the main ion beam, e.g., the collimated ions, is dispersed by the analyzer region 10 with respect to the mass to charge ratios (m/e), the ions are collected and counted by the ion detector 52. There are many different ways to detect ions. For example, the detector 52 may be an electron multiplier such as a channel electron multiplier, an electrostatic focused electron multiplier, or a magnetic or cross-field electron multiplier. Further, the detector may be a scintillation/photo multiplier, faraday collectors, or ion to electron converters such as solid state detectors. In addition, such detectors may include microchannel plate detectors and ion sensitive emulsions. Various commercially-available detectors for such purposes may be used for providing ion detection.

For example, the detector may be a detection plate at which different charged masses will hit the detection plate and all ions will be collected at the same time. With such simultaneous detection, although the collection is more efficient, high demands are put on the electronics of the detector. If the detector is set to be fixed to only one particular position, the accelerating voltage for the ionizer 56 is varied to collect all the specific ions at the same detector position. Such a detector is generally illustrated in FIG. 2 with detector slit 60 allowing for the ions at a particular position to be detected. One skilled in the art will recognize that any particular detector 52 may be used for ion detection. For example, several commercially-available detectors include microchannel plates (MCP), channeltrons, and microsphere plates (MSP).

The analyzer region 10 according to the present invention for the double-focusing mass spectrometer 50 is partially illustrated in FIG. 2 and further illustrated graphically in FIG. 1. Generally, the analyzer region 10 is provided with superimposed magnetic and electric fields in the ion path 21 of the analyzer region 10. Further, generally, according to the present invention, the electric field has a cylindrical geometry and is proportional to 1/r, where r is the radial distance associated with the cylindrical geometry. In other words, a generally radial electric field of cylindrical geometry is generated in the ion path 21 by an electrode configuration 11, e.g., the electric field intensity along a circumferential line 20 described by r in the z=0 plane is constant. Further, the equipotential lines within the ion path 21 would run substantially parallel to the z axis, while the electric field lines would generally be radial in x-y planes along the z axis in the ion path 21. Perpendicular to the radial electric field in the ion path 21 is the magnetic field which is generally parallel with the z axis.

The analyzer region 10 includes the electrode configuration 11 for use in providing the electric field of cylindrical geometry in the ion path 21. Generally, the electrode configuration 11 includes a first cylindrical sector electrode 12 and a second cylindrical sector electrode 14. Each of the two cylindrical sector electrodes 12, 14 have the same cylinder axis 15 extending through origin (0) but have different radii. In other words, the first cylindrical sector electrode 12 includes an inner surface 22 facing inward towards ion path 21 having a radius ($r_b$), and second cylindrical sector electrode 14 includes an inner surface 24 facing inward towards ion path 21 having a second radius ($r_a$). In other words, the cylindrical sector electrode surfaces 22, 24 are disposed in opposing relationship with one another. The ion path 21 is defined between the opposing cylindrical sector electrode surfaces 22, 24. In general, the electric field is provided by providing an electrical potential between the first cylindrical sector electrode 12 and second cylindrical sector electrode 14 such that the electrical potential between the electrodes is proportional to log(r).

The analyzer region 10 of the double-focusing mass spectrometer 50 according to the present invention employs the cylindrical geometry for the radial electric field (∈), i.e., a field inversely proportional to r, and a magnetic field (B) perpendicular to the electric field, i.e., parallel to the z axis. The polarity of the electric and magnetic fields can be chosen such that the forces from the electric and magnetic fields are anti-parallel. If F is the net force on an ion in the ion path 21, v is the component of ion velocity in the plane of deflection, and q is the ionic charge, then $$F=qBv-q\in.$$

Here a radial positive force is inward and a negative force is outward along the radius of curvature of an ion trajectory through the ion path. The radius of curvature r and its dispersion can then be expressed by $$r = \frac{mv^2}{qBv - q\varepsilon}, \text{ and}$$

$$\frac{dr}{r} = \left(\frac{Bv - 2\varepsilon}{Bv - \varepsilon}\right)\frac{dv}{v}.$$

Thus, a special case of double-focusing is provided, i.e., zero dispersion of r with respect to v, when the magnetic force (qvB) is just twice the electric force (q∈)

$$Bv = 2\in.$$

For an object and image at the entrance and exit of the field boundaries, respectively, this special case design yields direction-focusing at a deflection angle of $\pi/\sqrt{2}$(127.3°), exactly like a cylindrical electrostatic energy analyzer. In other words, the cylindrical sectors in such a design would be 127.3° sectors. Sectors of other angular configurations are possible. For example, in a more convenient 90° deflection angle shown in the embodiments illustrated herein, e.g., the apparatus shown in FIG. 8, the object and image foci are located at about 0.35r from the field boundaries. If (E) is the ion kinetic energy, the mass selected is given by $$m = \frac{q^2 B^2 r^2}{8E},$$

which may be compared with $$m = \frac{q^2 B^2 r^2}{2E}$$

for a simple magnetic sector (no electric field).

Therefore, desirable performance of the analyzer region 10 depends particularly on having the correct ratio of electric to magnetic fields at each point along the ion path 21. As a result, a proper bending radius or a radius of curvature is effected.

Generally, the magnetic field parallel to the z axis and orthogonal to the electric field in the ion path 21 is provided by yoke and pole assembly 40, as shown generally in FIG. 2, including first magnetic pole 16 and second magnetic pole 18 as shown in FIG. 1. The magnetic field preferably has a strength that is as high as possible. For example, the magnetic field strength may be in the range of about 1 T to about 2 T or even higher (referred to hereinafter as a high magnetic field). The permanent magnet has a pole gap preferably of about 1 mm to about 5 mm to provide such a high magnetic field in the ion path 21 of the analyzer region 10. For example, such high magnetic field may be provided by high energy-product NdFeB poles used with an iron yoke in the yoke and pole assembly 40. However, one skilled in the art will recognize that the magnetic field may be provided by any suitable permanent magnet, electromagnet, etc.

As described above, the performance of the double-focusing mass spectrometer apparatus 50, and particularly the analyzer region 10, depends on having the correct ratio of electric to magnetic field intensities at each point along the ion path 21. If the axial height along the z axis of the cylindrical sector electrodes 12, 14 is much larger than the spacing between them (i.e., $r_b - r_a$), then the field near the center of the electrodes 12, 14 (generally represented by circumferential line 20 extending through ion path 21) would provide such a correct ratio of electric to magnetic field intensities. However, the analyzer region 10 preferably requires that there be a high magnetic field parallel to the cylindrical axis (i.e., z axis). A high magnetic field enhances performance by making the ion energy higher for each selected mass (i.e., E is proportional to $B^2$), thereby making space charge and surface charge effects on the ion trajectories less important. As such, the spacing between the poles (i.e., pole gap) of the magnet is small. Therefore, the axial height along the z axis of the first and second cylindrical sector electrodes 12, 14 is limited by the small spacing between the poles 16, 18 of a permanent magnet used to provide such a high magnetic field. In other words, the axial height of the first cylindrical sector electrode 12 and the second cylindrical sector electrode 14 is limited by the magnet pole spacing. The axial height of the first cylindrical sector electrode 12 extends from a lower edge 34 to an upper edge 32 of the electrode 12 along the z axis. Likewise, the axial height of the second cylindrical sector electrode 14 extends from a lower edge 38 to upper edge 36 along the z axis. Due to the limited axial height of the electrodes 12, 14, the correct electric field for providing the desired ratio between electric and magnetic field intensities near the upper and lower edges of the cylindrical sector electrodes 12, 14 is not assured with use of just the electrodes 12, 14 alone.

To provide for a correct "fringing" field near the upper edges 32, 36 of the first and second cylindrical sector electrodes 12, 14, respectively, and near the lower edges 34, 38 of the first cylindrical and second cylindrical sector electrodes 12, 14, respectively, the electrode configuration 11 further includes arrays of intermediate electrodes 26, 28. With use of the arrays of intermediate electrodes 26, 28, the correct ratio of magnetic and electric field intensities is attained even with the axial height limitations resulting from the small magnetic pole spacing. As used herein, a fringing field refers to a magnetic or electric field which deviates from the ideal proximate to and/or outside the geometrical boundaries of the electrode configuration 11 and magnetic pole assembly. The arrays of intermediate electrodes 26, 28 allows the magnetic pole spacing to be reduced. Preferably, according to the present invention, the ratio of the axial height of the first and second cylindrical sector electrodes 12, 14 between the upper edges 32, 36 and lower edges 34, 38 to the radial distance between the first and second cylindrical sector electrodes 12, 14 is in the range of about 0.1 to 1.5. However, the ratio of the axial height of the first and second cylindrical sector electrodes 12, 14 to the radial distance between the first and second cylindrical sector electrodes may be greater than 1.5.

As shown in FIG. 1, the intermediate electrodes include a first electrode array 26 positioned between the upper edge 32 of first cylindrical sector electrode 12 and the upper edge 36 of the second cylindrical sector electrode 14. Likewise, a second electrode array 28 is positioned between the lower edges 34, 38 of the first and second cylindrical sector electrodes 12, 14. In one embodiment, as shown in FIG. 1, each of the arrays 26, 28 include a plurality of circular segment electrodes having different radii and spaced between the first and second cylindrical sector electrodes 12, 14. In other words, each of the segment electrodes of the first and second electrode arrays 26, 28 are circular segments with the same axis as the first and second cylindrical sector electrodes 12, 14 and which all generally have the same radial cross sectional dimensions. However, it will be recognized from the description herein as further described below that the shape of the intermediate electrodes may vary.

Generally, each of these circular segment electrodes has a voltage applied thereto that is equal to the voltage which would exist at the same value of r if the first and second cylindrical sector electrodes 12, 14 were infinite in height. Application of the appropriate voltages in the configuration of the first and second electrode arrays 26, 28 to assure correct electric field geometry near the upper and lower edges of the first and second cylindrical sector electrodes 12, 14 is illustratively shown in the embodiments of FIGS. 3 and 4.

Figure 3:
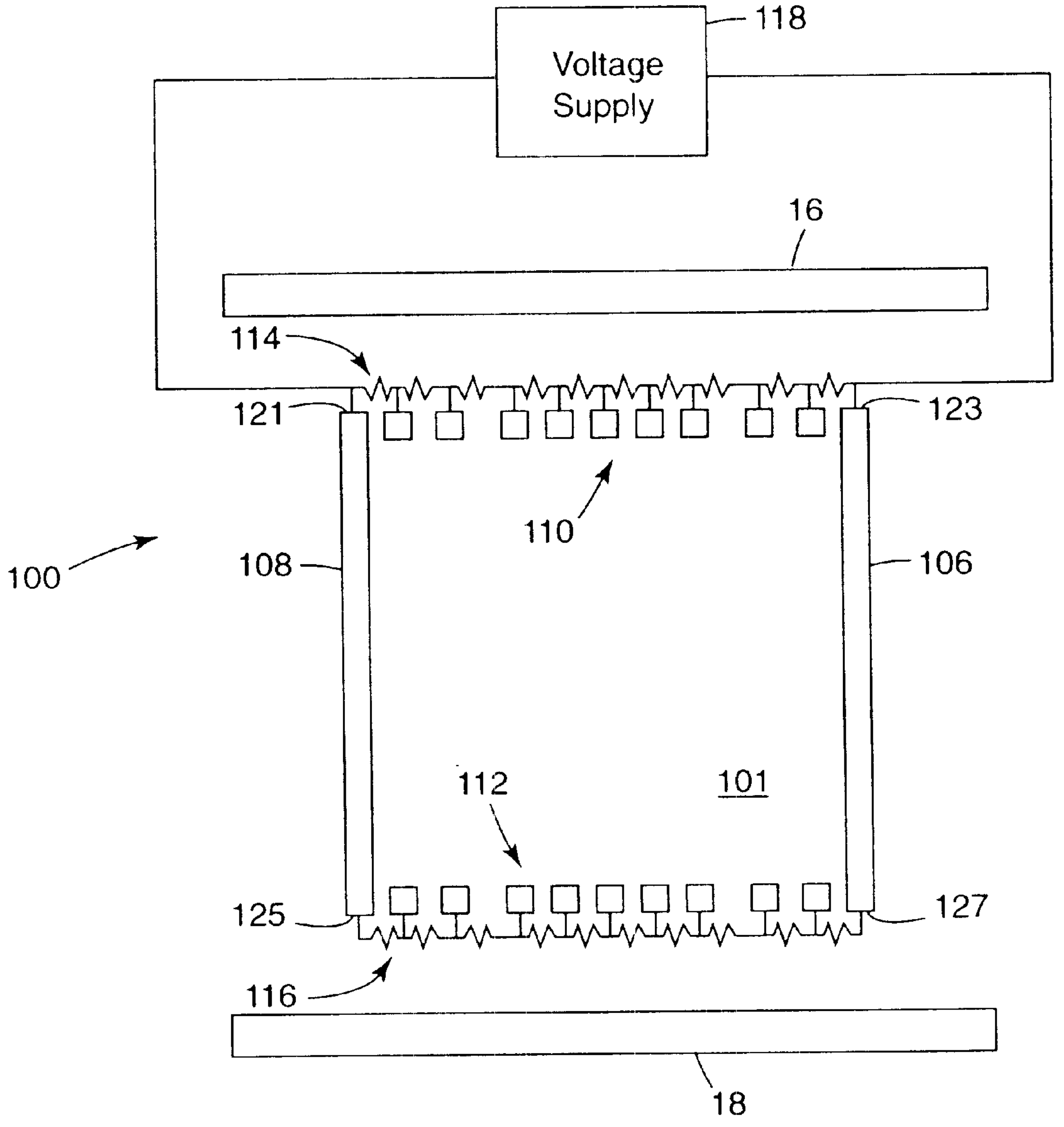
FIG. 3 is one embodiment of an electrode configuration for the analyzer region shown generally in FIG. 1.

FIG. 3 shows one embodiment of an electrode configuration 100 positioned between magnet poles 16, 18 for assuring a correct electric field geometry throughout the ion path 101. The electrode configuration 100 includes first and second cylindrical sector electrodes 106, 108 substantially like those shown in FIG. 1. First and second electrode arrays 110, 112 of circular segment electrodes are provided to achieve the correct fringing field near the upper and lower edges of the first and second cylindrical sector electrodes 106, 108. The first electrode array 110 includes a predetermined number of circular segment electrodes evenly spaced between the upper edges 121, 123 of the first and second cylindrical sector electrodes 108, 106. Likewise, the second array of electrodes 112 includes the same predetermined number of circular segment electrodes evenly spaced between the lower edges 125, 127 of the first and second cylindrical sector electrodes 108, 106. Voltage supply 118 applies a predetermined voltage (Vd) to each of the electrodes of the first and second electrode arrays 110, 112. The predetermined voltages applied to the electrodes vary logarithmically across the first and second array of electrodes 110, 112 at a particular point in time. Such logarithmic varying voltages are applied by using logarithmically varying resistors of a resistor network 114 which forms a voltage divider network with voltage supply 118 for applying the logarithmically varying predetermined voltages to the electrodes of the first array of electrodes 110. Likewise, a resistor network 116 forms a voltage divider network with voltage supply 118 for applying logarithmically varying voltages to the electrodes of the second array of electrodes 112.

Figure 4:
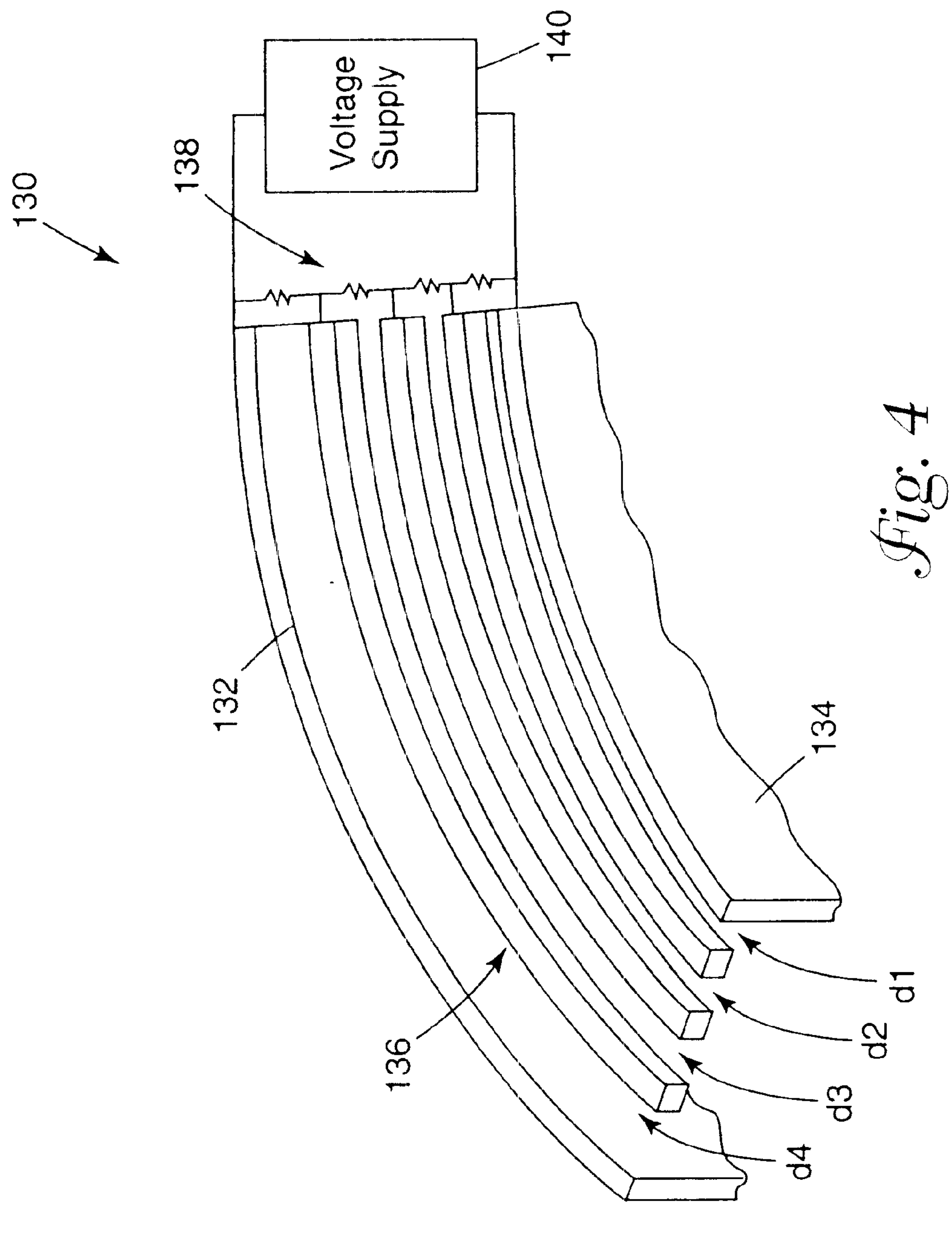
FIG. 4 is an alternate electrode configuration for the analyzer region shown generally in FIG. 1.

FIG. 4 shows an alternate way of achieving the same fields as achieved with the electrode configuration and voltage divider networks shown in FIG. 3. The electrode configuration 130 as shown in FIG. 4 includes an electrode array 136 including a predetermined number of circular segment electrodes which are spaced logarithmically in radius. In other words, the gaps d1–d4 are sized to space the circular segment electrodes of the array 136 between first and second cylindrical sector electrodes 132, 134 in a logarithmic manner. In combination with such logarithmic spacing of the electrodes of the array of electrodes 136, the resistors of resister network 138 connected between the electrodes are of equal resistance values, unlike the configuration of FIG. 3 where such resistance values varied logarithmically. The voltage supply 140 in combination with the resistor network 138 form a voltage divider network which applies the appropriate voltages to the first and second cylindrical sector electrodes 132, 134 and the array of electrodes 136.

Figure 5:
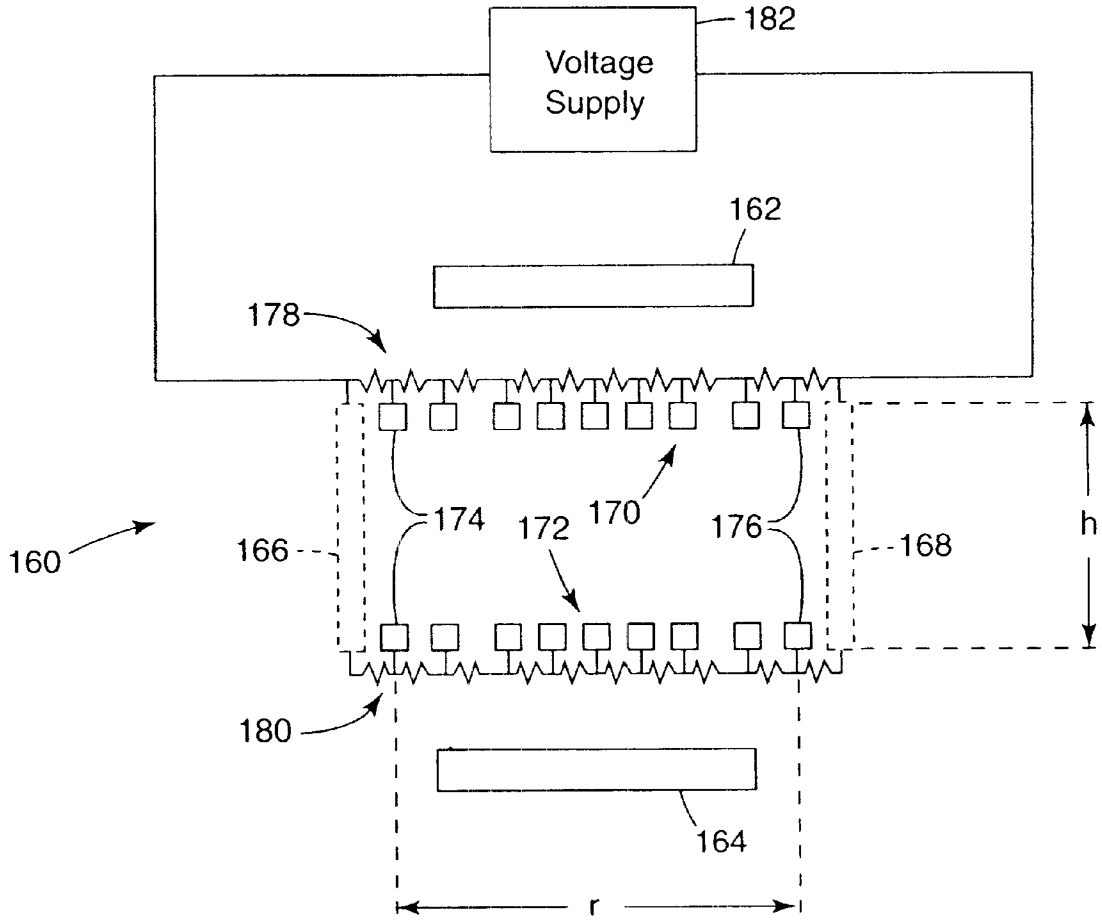
FIG. 5 is another alternate electrode configuration for the analyzer region shown generally in FIG. 1.

FIG. 5 shows yet another alternate electrode configuration 160 for achieving a correct electric field geometry such that the ratio of the electric to magnetic field forces at each point along the ion path is attained. Electrode configuration 160 includes at least a first and second array of electrodes 170, 172 positioned between magnetic poles 162, 164. If the first and second arrays of electrodes 170, 172 are extended over a radial range of r which is much larger than the axial height (h) of the electric field, and also therefore much larger than the magnet pole gap, the electrode configuration 160 may only optionally require first and second cylindrical sector electrodes 166, 168 which form the radial boundaries of the electric field. For example, if the cylindrical sector electrodes 166, 168 which form the radial boundaries of the electric field are sufficiently far away from the paths taken by the ions in the analyzer region, then their influence on the field experienced by the ions is small, and one or both of the cylindrical sector electrodes 166, 168 may be eliminated from the electrode configuration 160. As such, the electric field superimposed with the magnetic field may be completely provided with the use of two electrode arrays 170, 172 generally parallel to one another and which extend over a range of r that is much larger than the axial height of the magnet gap between poles 162, 164. Preferably, the electrode arrays extend over a range of r that is at least about 10 times the magnet gap to eliminate the use of one or more of the cylindrical sector electrodes. If the cylindrical sector electrodes 166, 168 are not used, then the potentials applied to the innermost electrodes 176 and the outermost electrodes 174 of the first and second electrode arrays 170, 172 can be adjusted to minimize the deviation from ideality of the electric field along the ion path. For example, the potentials applied to the outer electrodes can be increased to minimize the deviations from a log(r) potential in the region of the ion trajectory.

The ideal fields for the double-focusing mass spectrometer apparatus 50 include the cylindrical geometry for the electric field and a magnetic field which is perfectly homogenous within the boundaries of the magnet poles and zero outside those boundaries. As previously described in the Background of the Invention section herein, it is virtually impossible to construct a magnet with this ideal homogenous magnetic field. In practice, there is always a magnetic fringing field which extends beyond the pole boundaries, and the magnetic field inside the pole boundaries is usually significantly inhomogeneous. For example, inside the pole boundaries, the magnetic field at one position may vary by 10% from the magnetic field at another position.

The optimum performance of the analyzer region 10 depends particularly on having the correct ratio of electric to magnetic fields at each point along the ion path 21. Such inhomogeneity in the magnetic field must be corrected to maintain the optimum ratio of the electrical and magnetic fields superimposed in the ion path 21. In accordance with an electric and magnetic fringing field correction process according to the present invention, it is possible to shape the electric field in a manner which deviates from the ideal cylindrical geometry such that it matches the deviation from the ideality of the magnetic field due to its inhomogeneity so as to maintain the optimum ratio of the superimposed magnetic and electric fields. Such a correction process is initiated with the design and construction of the magnet providing the magnetic field. After the magnet is designed and constructed, the magnetic field generated by the constructed magnet may be measured and mapped. The magnetic field measurement and mapping involves measuring the distribution of the magnetic field along the coordinates typical for ion trajectory through the analyzer region 10. Such a magnetic field distribution defines the desired electric field as the electric field is at a particular ratio with respect to the magnetic field. For example, the magnetic field of a magnet design may provide a magnetic field that is larger at the center region of the magnet pole as opposed to the edges. This would then require a larger electric field in this center region. The electric field at each point in the ion trajectory should be given by the equation $$\varepsilon = \left(B\left(\frac{E}{2m}\right)\right)^{\frac{1}{2}}.$$

After the magnetic field is measured and mapped, the fringing field correction electrodes, e.g., first and second electrode arrays 26, 28, are designed using finite element simulation. In this process, the electrode shapes and/or positions are adjusted empirically. Then a numerical calculation of the three-dimensional field distribution is performed. Adjustments are then made until the electric field along the ion path (ξ) is suitably approximated by the expression $$\varepsilon(\xi) = B(\xi)\left(\frac{E}{2m}\right)^{\frac{1}{2}}.$$

For example, the first and second arrays of electrodes 26, 28 are configured such that the electric field matches the deviation from the ideality of the magnetic field so as to maintain the appropriate ratio of the electric field to magnetic field in the ion path 21 as desired. Although, preferably, according to the present invention, the electrode structure is configured to provide the appropriate ratio, one skilled in the art from the description herein will recognize that the magnetic pole structure, the electrode structure, or a combination thereof, may be configured to provide the appropriate ratio.

Figure 6:
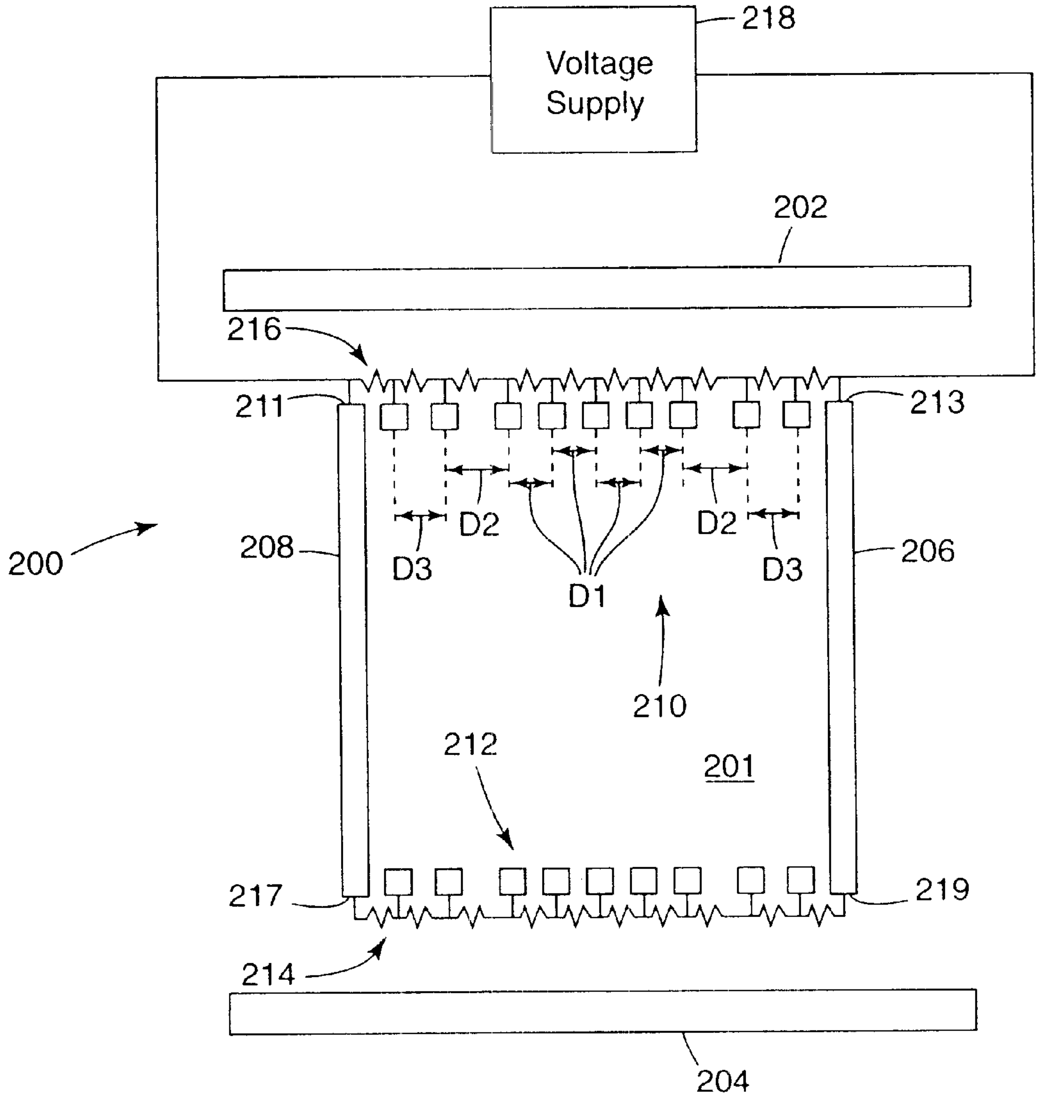
FIG. 6 is yet a further alternate electrode configuration for the analyzer region shown generally in FIG. 1 employing techniques for compensating for an inhomogeneous magnetic field.
Figure 7:
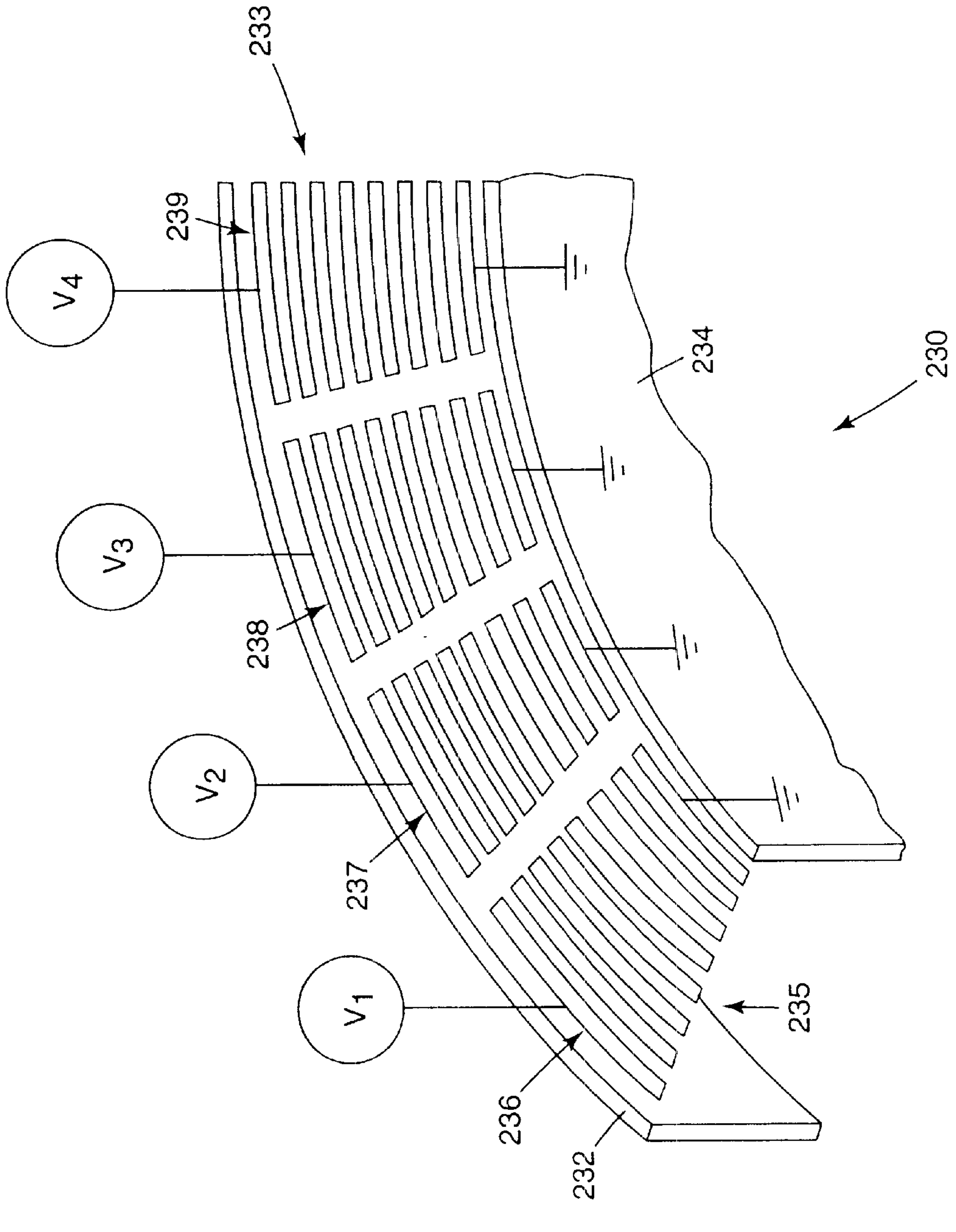
FIG. 7 is yet another alternate electrode configuration for the analyzer region shown generally in FIG. 1 employing techniques for compensating for an inhomogeneous magnetic field.

FIGS. 6 and 7 show two illustrative embodiments of alternate electrode configurations 200, 230, respectively. Each electrode configuration is adjusted to give the optimum approximation to the desired electric field for matching the deviation from ideality of the magnetic field provided by the magnet poles. As shown in FIG. 6, the electrode configuration 200 includes first and second cylindrical sector electrodes 206, 208 positioned between magnet poles 202, 204. Further, the electrode configuration 200 includes first and second arrays of circular segment electrodes 210, 212. First electrode array 210 is positioned between the upper edges 211, 213 of first and second cylindrical sector electrodes 208, 206, respectively. Likewise, second electrode array 212 is positioned between the lower edges 217, 219 of first and second cylindrical sector electrodes 208, 206, respectively.

Each of the first and second arrays of electrodes 210, 212 include a predetermined number of circular segment electrodes which are spaced to give the optimum approximation to the desired electric field to match the deviation from ideality of the magnetic field. For example, as shown in FIG. 6, in a typical case where the magnetic field is larger at the center of the magnet poles, the spacing of the circular segment electrodes in the arrays 210, 212 will be smaller in the center region as represented by gaps DLL as opposed to the spacing towards the other regions of the ion path 201 as represented by the larger gaps d2, d3. As such, a correspondingly larger electric field is provided in the center region to match the magnetic field which is larger at the center of the magnet poles. Therefore, the desired ratio of the magnetic field to the electric field is accomplished. Further, as shown in FIG. 6, the first and second electrode arrays 210, 212 have the appropriate voltages applied thereto by the voltage divider network including voltage supply 218 and resistor networks 216, 214 in a like manner to that previously described herein.

As shown in the embodiment of FIG. 7, the adjustment of the electric field may be accomplished by formation of electrode sectors 236–239 positioned between first and second cylindrical sector electrodes 232, 234. Appropriate voltages V1–V4 may be applied to such electrode sectors to provide an electric field of the appropriate ratio to the magnetic field. This embodiment allows the required relationship between ∈ and B to be fulfilled piecewise, sector by sector.

One skilled in the art will recognize that the first and second arrays of electrodes 26, 28 positioned between the upper edges 32, 36 and lower edges 34, 38 of the first and second cylindrical sector electrodes 12, 14 as shown in FIG. 1 may take the form of various configurations in providing a desired electric field to provide the correct ratio of electric to magnetic fields in compensating for inhomogeneity of the magnet poles. For example, the size, the position, the shape, the spacing, and/or any other suitable characteristic of the electrodes may be adjusted to provide the appropriate electric field. As such, the present invention is not limited to any particular configuration of the intermediate electrodes of the first and second electrode arrays 26, 28, but is limited only according to the scope of the appended claims. For example, as shown by the dashed line electrode ends 233, 235 in FIG. 7, the electrode arrays may include electrode segments which are not parallel to one another, and are not circular in shape. Such shaping of the electrodes of the arrays may be beneficial, for example, in the attainment of the desired electric field at the ends of the analyzer region.

This method of establishing the electric field geometry matching the deviation of the magnetic field such that a correct ratio is maintained in the ion path 21 of the analyzer region 10 may be accomplished effectively via the use of electrodes which are lithographically deposited on substrates. By lithographically depositing such electrodes on substrates for use in defining the electric field, tailoring of the electrodes in order to tailor the electric field to match the field of the inhomogeneous magnet may be readily accomplished. The use of electrodes lithographically deposited on substrates, e.g., ceramic substrates, shall be described further with regard to the double-focusing mass spectrometer apparatus 300 shown and described with reference to FIGS. 8–11.

Figure 8:
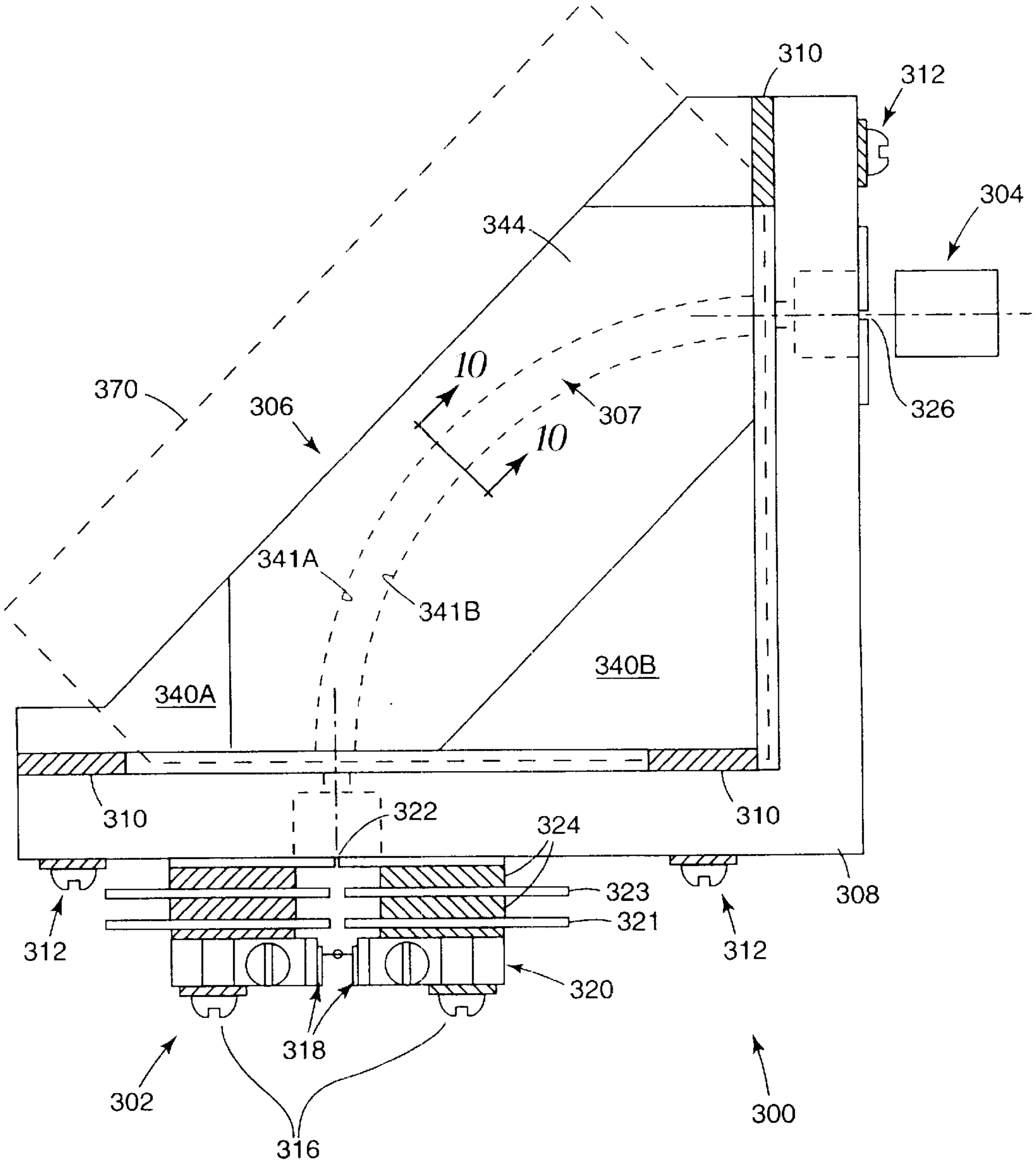
FIG. 8 shows a top view of one illustrative embodiment of a double-focusing mass spectrometer apparatus according to the present invention.
Figure 9:
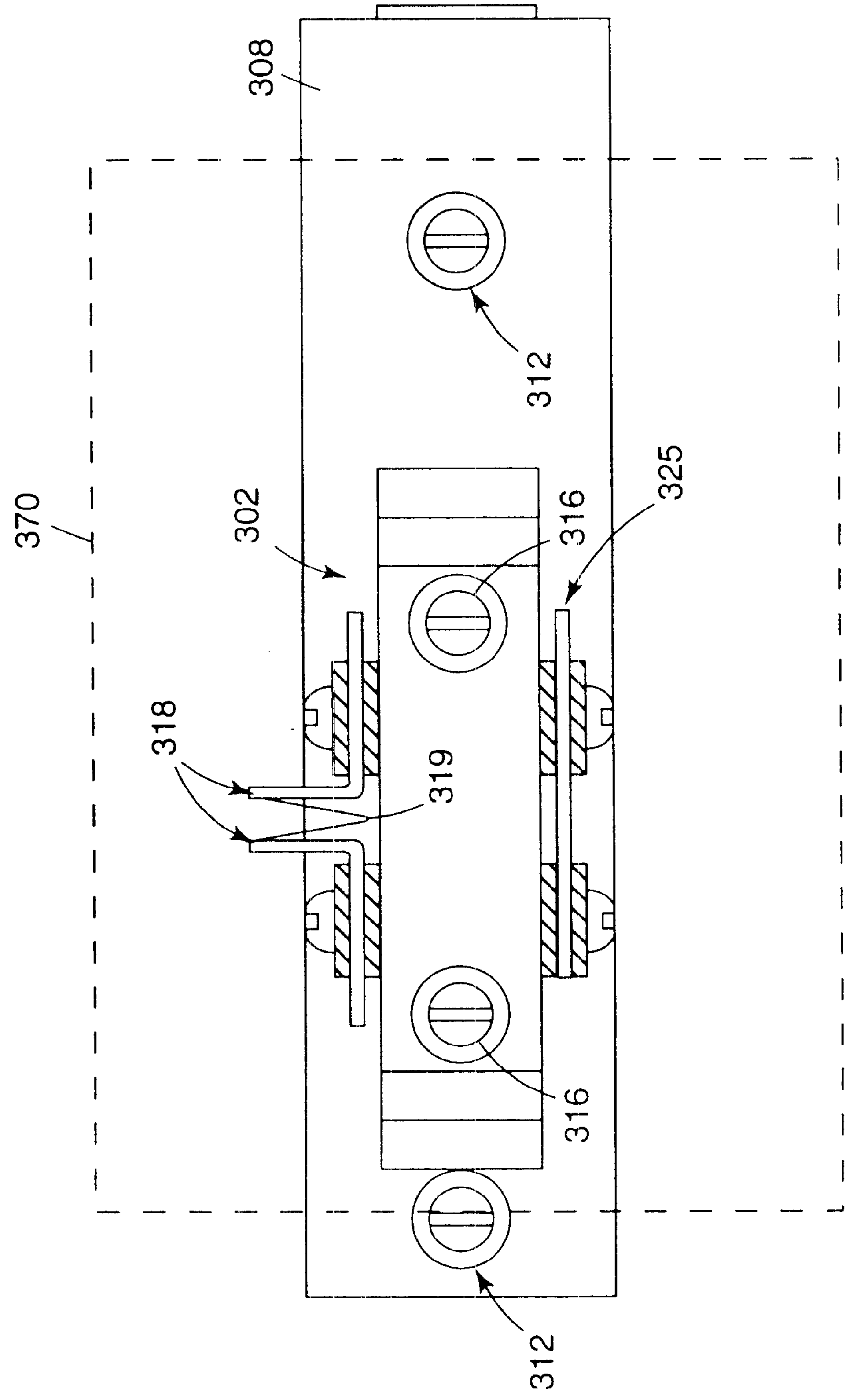
FIG. 9 is a side view of the double-focusing mass spectrometer apparatus shown in FIG. 8.

FIG. 8 shows one illustrative embodiment of a double-focusing mass spectrometer apparatus 300 according to the present invention. FIG. 9 is a side view of the mass spectrometer apparatus 300. The double-focusing mass spectrometer apparatus 300 includes an ion source 302 for providing ions into an ion path 307 defined in an analyzer region 306. The trajectory of the ions is effected in the analyzer region 306 by superimposed magnetic and electric fields in the ion path 307 with the output provided to a detector 304. FIG. 8 is a top view of the double-focusing mass spectrometer apparatus 300 with a yoke and magnet pole 370 for providing the magnetic field shown in dashed line.

Preferably, the ion source 302 is an electron impact ionizer with a slit geometry, e.g., a slit geometry refers to an ion aperture which is made in the radial dimension (r). The electron impact ionizer includes a tungsten hairpin filament emitter 319 operably connected to filament electrodes 318. The ion source 302 further includes anode 320, extractor electrode 321, and focus electrode 323 all aligned for providing ions through object slit 322. Further, the ion source 302 includes an electron collector 325 for monitoring the ionizing electron current applied to the ionizer.

The components of the ion source 302 are connected together with suitable insulative portions 324 positioned as required. The ion source 302 is mounted on an L-shaped frame 308 by mounting hardware 316. The ion source 302 is mounted such that it is sealed with ion path 307 to provide an airtight throughway from the ion source 302 to the analyzer region 306.

The detector 304 is preferably a commercially-available detector such as a Galileo multi-channel plate available under the trade designation 1333–1200, e.g., a microchannel plate having a thickness of about 1.1 mm and a gain of approximately $10^5$. However, any suitable detector may be used.

The magnet 370 may include an iron yoke mounting high energy-product NdFeB poles. For example, the magnet may have a pole gap of about 4 mm to provide a magnetic flux density of approximately 1 T. The detector 304 detects the ions through slit 326.

As described previously herein, the focus of the present invention is with respect to the analyzer region 306 of the double-focusing mass spectrometer apparatus 300. The analyzer region 306 is mounted with respect to the L-shaped frame 308 by mounting hardware 312 and is insulated from the L-shaped frame 308 by insulated regions 310.

The analyzer region 306 includes an outer electrode portion 340A and an inner electrode portion 340B. Outer electrode portion 340A includes an outer cylindrical sector electrode surface 341A defining a first radial distance from a cylindrical axis and the inner electrode portion 340B includes a second cylindrical sector electrode surface 341B defining a second radial distance from the same cylindrical axis. The cylindrical sector electrode surfaces 341A and 341B define the ion path 307 therebetween.

Figure 10:
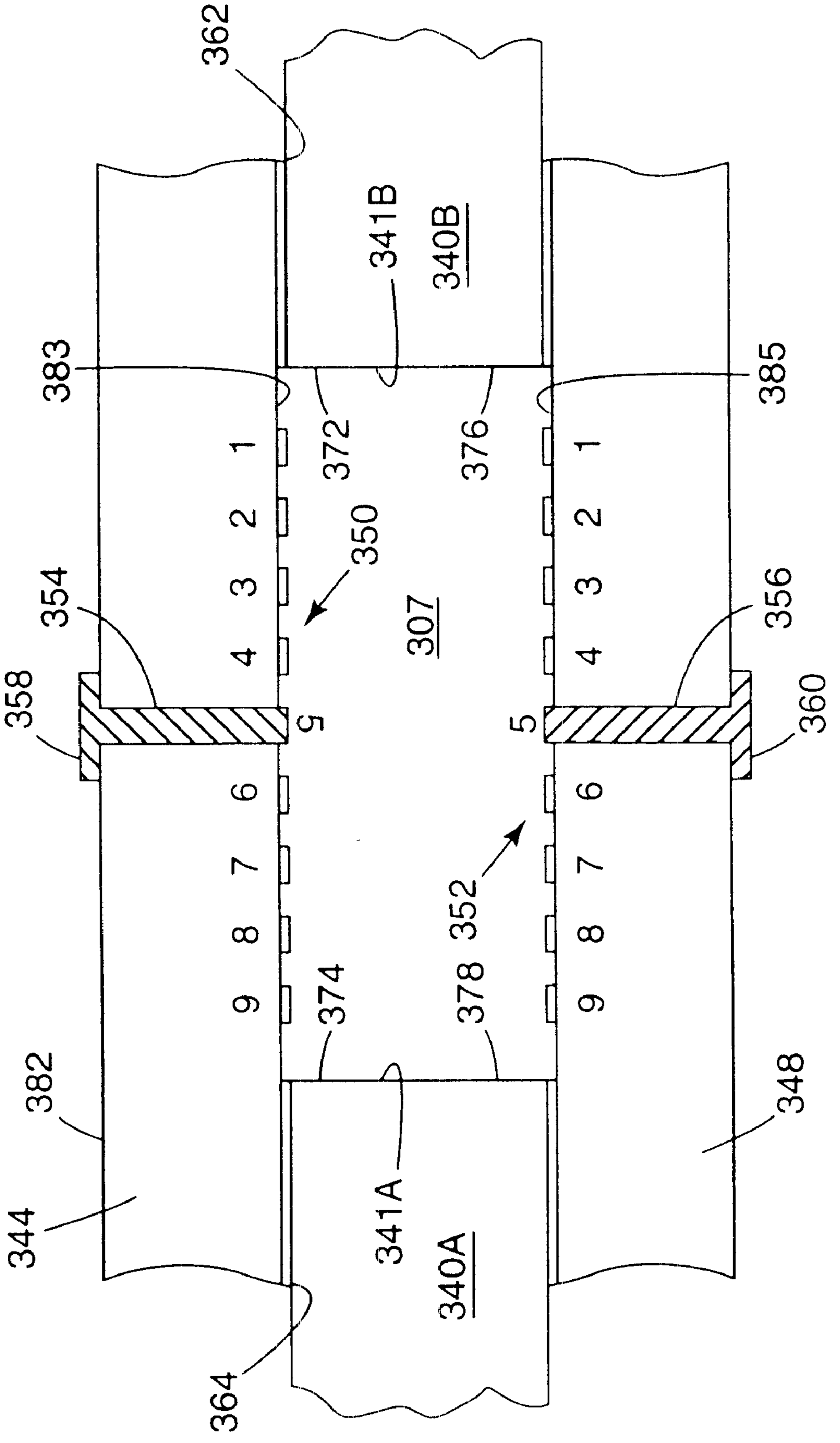
FIG. 10 is a cross-sectional view of the ion path shown in FIG. 8 taken along line 10—10 thereof.

FIG. 10 is a cross-section view taken at line 10—10 of FIG. 8. FIG. 10 provides a more detailed view of the analyzer region 306. As shown in FIG. 10, in addition to the outer and inner electrode portions 340A and 340B, the analyzer region 306 includes a first cylindrical electrode cap plate 344 and a second cylindrical electrode cap plate 348. The first and second cylindrical electrode cap plates 344, 348 sandwich the outer and inner electrode portions 340A and 340B to further define the ion path 307.

Desired configurations of electrode arrays 350, 352 are lithographically deposited on first and second cylindrical electrode cap plates 344, 348, respectively. As shown in FIG. 10, each electrode array 350, 352 includes nine intermediate electrodes deposited between first and second cylindrical electrode surfaces 341A, 341B. For example, electrode array 350 includes nine intermediate electrodes deposited on surface 383 between upper edges 374, 372 of electrode surfaces 341A, 341B while electrode array 352 includes nine intermediate electrodes deposited on surface 385 between the lower edges 378, 376 of electrode surfaces 341A, 341B. As used herein, depositing electrodes on a surface includes depositing by chemical vapor deposition processes, screen printing, vacuum evaporation, sputtering, or any other method of forming the electrodes on the substrate as opposed to attaching a discrete part to the substrate.

The electrode cap plates 344, 348 may be formed of any insulative substrate material, preferably ceramic materials. The electrode array 350, 352 may be any conductive material, e.g., copper or other metal, graphite, doped semiconductor or superconductor materials formed on the substrate material. Further, the inner and outer electrode portions 340A, 340B may be formed of a copper alloy or any other appropriate metal.

As shown in FIGS. 10 and 11, the circular segment electrodes of the electrode arrays 350, 352 are connected to each other via a resistor string which may also be deposited lithographically on the opposite surface of the cap plates 344, 348 on which the electrode arrays 350, 352 are deposited so as to establish the correct voltages applied to the electrodes of the electrode array 350, 352. For example, the intermediate electrode 5 of electrode array 350 is connected through a conductor filled via 354 to a resister pad 358 on the outer surface 382 of cap plate 344. Likewise, intermediate electrode 5 of electrode array 352 is connected to resister pad 360 by conductor filled via 356 through cap plate 348. Using such construction techniques, any of the electrode configurations, particularly the electrode array configurations as described herein, may be produced using lithographic processing, particularly lithographic deposition of electrodes and resistors. This is particularly beneficial when such configurations require fine line widths between electrodes.

FIG. 11A further shows in detail first cylindrical electrode cap plate 344, which is substantially similar to cap plate 348. FIG. 11A is a bottom view of the cap plate 344 which shows the inner surface 383 having an inner electrode 362 and an outer electrode 364 along with the electrode array 350 lithographically deposited thereon. The inner and outer electrodes 362, 364 when assembled with inner and outer electrode portions 340A and 340B are in direct contact with such portions 340A, 340B. As shown, the array of electrodes 350 include circular segment electrodes, all of different radii but of substantially the same line width. Further, the vias for connection to the opposite side of the electrode cap plate 344 are shown by the reference numerals 385 with via 354 as shown in FIG. 10 numbered differently.

FIG. 11B is a top view of first cylindrical electrode cap plate 344 showing the outer surface 382 on which a lithographically deposited resister string R1–R10 is deposited. For example, as shown in FIGS. 8–11, an electrode configuration very similar to that illustratively shown in FIG. 3 is provided. For example, the intermediate electrodes of the electrode arrays 350, 352 are equally spaced between the inner and outer electrode surfaces 341A, 341B. Further, as shown in FIG. 11B, the resistors R1–R10 vary logarithmically across the intermediate electrodes of the electrode array 350. In other words, R1 which connects the inner electrode 362 to intermediate electrode 1, R2 which connects the intermediate electrode 1 and intermediate electrode 2 of electrode array 350, and R3 which is connected between intermediate electrode 2 and intermediate electrode 3 of the electrode array 350 vary logarithmically.

Figure 12A:
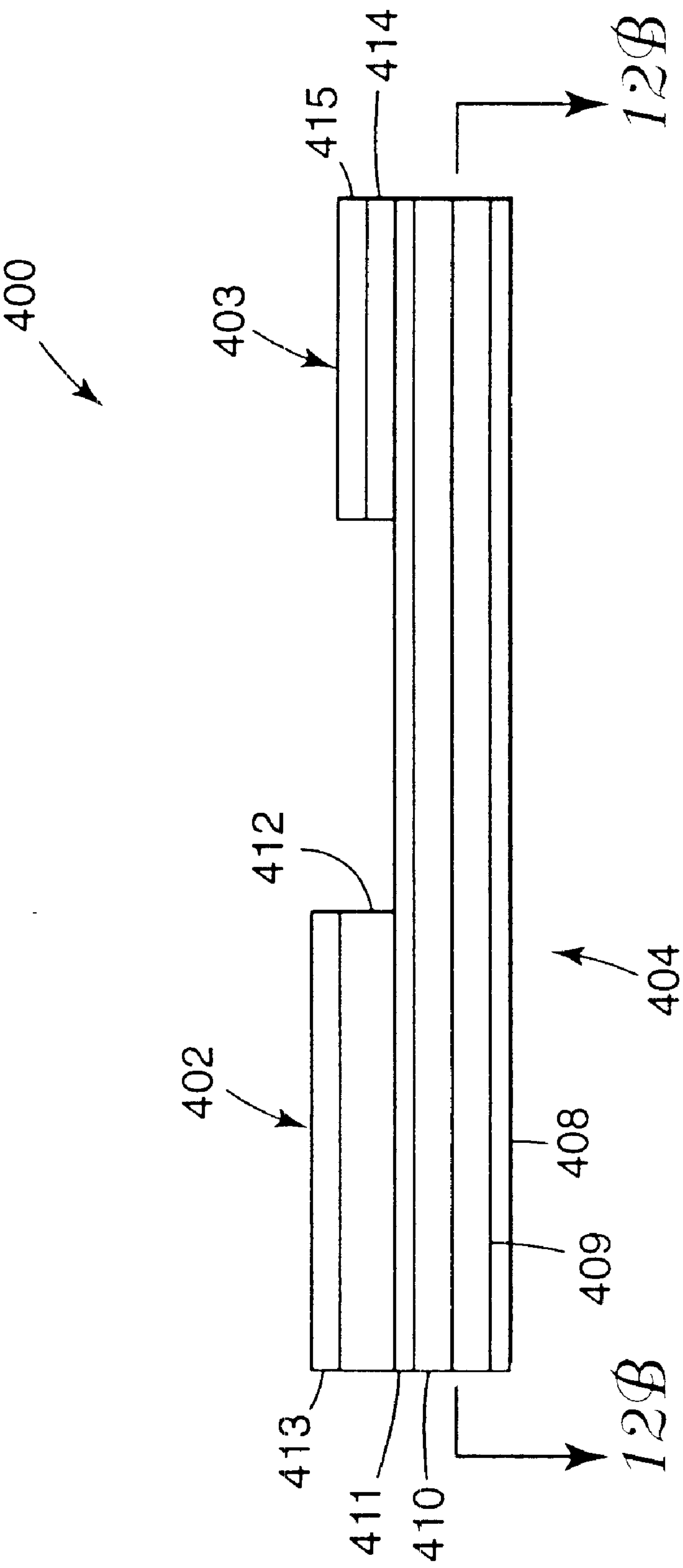
FIG. 12A is a side view of an alternate illustrative embodiment of a double-focusing mass spectrometer apparatus according to the present invention.
Figure 12B:
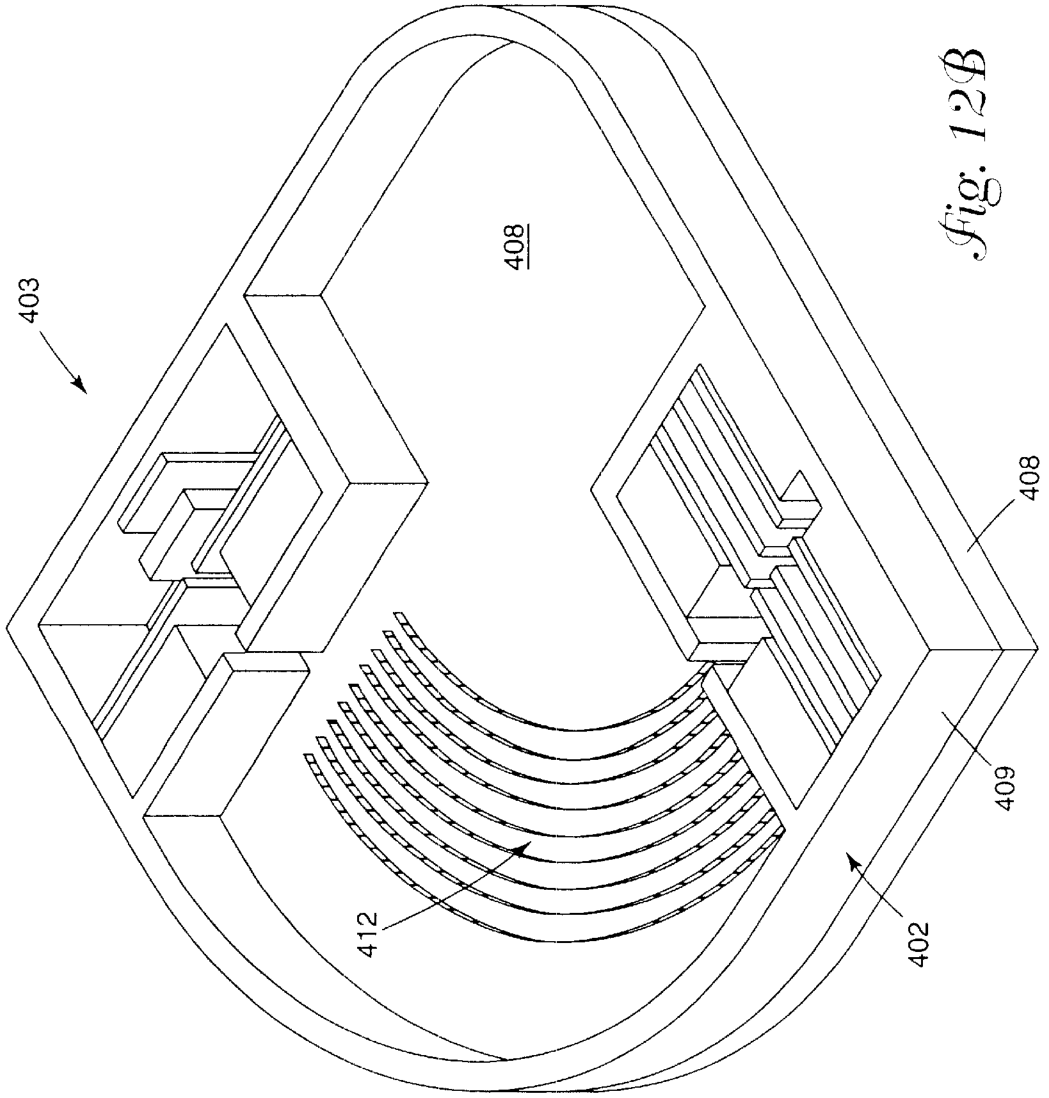
FIG. 12B is a cross-sectional perspective view taken along lines 12B—12B of the mass spectrometer apparatus of FIG. 12A showing an alternate construction technique for the double-focusing mass spectrometer apparatus according to the present invention.

FIGS. 12A and 12B illustrate an additional embodiment of a double-focusing mass spectrometer apparatus 400 according to the present invention. FIG. 12A is a side view of the mass spectrometer apparatus 400 with FIG. 12B being a cross-sectional view along line 12B—12B as shown in FIG. 12A. FIGS. 12A and 12B illustrate a fabrication method for a mass spectrometer apparatus according to the present invention.

The mass spectrometer apparatus 400 includes an ionizer 402, a detector 403, and an analyzer region 404 all formed together in a simplified process. As shown in FIG. 12A, the mass spectrometer apparatus 400 is formed of multiple layers of ceramic plates. For example, in FIG. 12A the various layers include 408–415. Each of the layers is provided separately and hermetically sealed to one another by glass solder joints.

A portion of the mass spectrometer apparatus 400 is shown in FIG. 12B in the cross-sectional view along line 12B—12B of FIG. 12A to generally illustrate the fabrication process. This perspective view shows that each of the ceramic layers 408–415 can have various layers formed thereon. For example, ceramic layer 408 may include an electrode array 412 lithographically deposited thereon. In addition, discrete components may be used with the ceramic layers, although it is preferred to fabricate electrode arrays by lithographic deposition techniques.

One skilled in the art will recognize that any of the electrode configurations described herein or combinations thereof may be formed in the manner as described with regard to FIGS. 12A and 12B. Further, other fabrication techniques may be utilized to provide a double-focusing mass spectrometer apparatus according to the present invention as described herein. The present invention is not limited to one particular fabrication technique.

All patents and references disclosed herein are incorporated by reference in their entirety, as if individually incorporated. Further, although the present invention has been described with particular reference to various embodiments thereof, variations and modifications of the present invention can be made within the contemplated scope of the following claims, as is readily known to one skilled in the art.

What is claimed is:

1. A double-focusing mass spectrometer apparatus comprising:

a first cylindrical sector electrode surface defined at a first radial distance from a cylindrical axis, the first cylindrical sector electrode surface having an upper and lower edge;

a second cylindrical sector electrode surface defined at a second radial distance from the cylindrical axis, the second cylindrical sector electrode having an upper and lower edge corresponding to the upper and lower edge of the first cylindrical sector electrode, wherein an ion path is defined between the first and second cylindrical sector electrode surfaces;

a first magnet pole and a second magnet pole positioned proximate the upper and lower edges of the first and second cylindrical sector electrode surfaces, respectively, for providing a magnetic field in the ion path; and a first array of electrodes positioned between the upper edges of the first and second cylindrical sector surfaces and a second array of electrodes positioned between the lower edges of the first and second cylindrical sector surfaces for use with the first and second cylindrical sector electrode surfaces to provide a desired electric field in the ion path perpendicular to the magnetic field, wherein the first and second arrays of electrodes are configured as a function of the magnetic field such that a desired ratio of magnetic field to electric field is attained in substantially the entire ion path such that mass selection using the mass spectrometer is achieved independent of ion velocity.

2. The apparatus of claim 1, wherein a ratio of a length of the first and second cylindrical sector electrode surfaces between the upper and lower edges in the direction of the cylindrical axis to the distance between the first and second cylindrical sector electrode surfaces is in the range of about 0.1 to 1.5

3. A double-focusing mass spectrometer apparatus comprising:

a first cylindrical sector electrode surface defined at a first radial distance from a cylindrical axis, the first cylindrical sector electrode surface having an upper and lower edge;

a second cylindrical sector electrode surface defined at a second radial distance from the cylindrical axis, the second cylindrical sector electrode having an upper and lower edge corresponding to the upper and lower edge of the first cylindrical sector electrode, wherein an ion path is defined between the first and second cylindrical sector electrode surfaces;

a first magnet pole and a second magnet pole positioned proximate the upper and lower edges of the first and second cylindrical sector electrode surfaces, respectively, for providing a magnetic field in the ion path;

a first array of electrodes positioned between the upper edges of the first and second cylindrical sector surfaces and a second array of electrodes positioned between the lower edges of the first and second cylindrical sector surfaces for use with the first and second cylindrical sector electrode surfaces to provide a desired electric field in the ion path perpendicular to the magnetic field, wherein the first array of electrodes includes at least two electrodes evenly spaced between the upper edges of the first and second cylindrical sector electrode surfaces, and further wherein the second array of electrodes includes at least two electrodes evenly spaced between the lower edges of the first and second cylindrical sector electrode surfaces; and a voltage supply circuit for applying a predetermined voltage to each of the first and second cylindrical sector electrode surfaces and to each of the electrodes of the first and second electrode arrays, wherein the predetermined voltage applied varies logarithmically across the first and second array of electrodes.

4. The apparatus of claim 3, wherein the voltage supply circuit includes a voltage divider network of logarithmically varying resistors.

5. A double-focusing mass spectrometer apparatus comprising:

a first cylindrical sector electrode surface defined at a first radial distance from a cylindrical axis, the first cylindrical sector electrode surface having an upper and lower edge;

a second cylindrical sector electrode surface defined at a second radial distance from the cylindrical axis, the second cylindrical sector electrode having an upper and lower edge corresponding to the upper and lower edge of the first cylindrical sector electrode, wherein an ion path is defined between the first and second cylindrical sector electrode surfaces;

a first magnet pole and a second magnet pole positioned proximate the upper and lower edges of the first and second cylindrical sector electrode surfaces, respectively, for providing a magnetic field in the ion path; and a first array of electrodes positioned between the upper edges of the first and second cylindrical sector surfaces and a second array of electrodes positioned between the lower edges of the first and second cylindrical sector surfaces for use with the first and second cylindrical sector electrode surfaces to provide a desired electric field in the ion path perpendicular to the magnetic field, wherein the first array of electrodes includes at least two electrodes logarithmically spaced between the upper edges of the first and second cylindrical sector electrode surfaces, and further wherein the second array of electrodes includes at least two electrodes logarithmically spaced between the lower edges of the first and second cylindrical sector electrode surfaces.

6. The apparatus of claim 5, wherein the apparatus further includes a voltage supply circuit for applying a predetermined voltage to each of the first and second cylindrical sector electrode surfaces and to each of the electrodes of the first and second electrode arrays.

7. The apparatus of claim 6, wherein the voltage supply circuit includes a voltage divider network of equally valued resistors.

8. The apparatus of claim 1, wherein the first and second arrays of electrodes are spaced as a function of the magnetic field such that a desired ratio of magnetic field to electric field is attained in substantially the entire ion path.

9. The apparatus of claim 1, wherein the first and second arrays of electrodes are shaped as a function of the magnetic field such that a desired ratio of magnetic field to electric field is attained in substantially the entire ion path.

10. A double-focusing mass spectrometer apparatus comprising:

two or more substrate portions positioned to define an ion path having superimposed magnetic and electric fields provided therein, wherein a first substrate portion includes a first array of electrodes formed on one side thereof defined radially from an axis and wherein a second substrate portion includes a second array of electrodes formed on a side thereof defined radially from the axis, the first and second arrays of electrodes are positioned generally parallel to one another for use in providing the electric field in the ion path; and a first and second magnet pole located proximate the two or more substrate portions for providing the magnetic field in the ion path orthogonal to the electric field, wherein a radial distance along which the first and second array of electrodes are defined is greater than about 10 times a distance in the direction of the axis between the parallel first and second arrays of electrodes.

11. The apparatus of claim 10, wherein the first and second arrays of electrodes are first and second arrays of circular segment electrodes.

12. The apparatus of claim 11, wherein the apparatus further includes:

a first cylindrical sector electrode surface defined at a first radial distance from the axis, the first cylindrical sector electrode surface having an upper and lower edge; and a second cylindrical sector electrode surface defined at a second radial distance from the axis, the second cylindrical sector electrode surface having an upper and lower edge corresponding to the upper and lower edge of the first cylindrical sector electrode surface, the ion path defined between the first and second cylindrical sector electrode surfaces, wherein the first array of circular segment electrodes is positioned between the upper edges of the first and second cylindrical sector surfaces and the second array of circular segment electrodes is positioned between the lower edges of the first and second cylindrical sector surfaces for use in providing the electric field in the ion path.

13. The apparatus of claim 12, wherein the first array of circular segment electrodes includes at least two circular segment electrodes evenly spaced between the upper edges of the first and second cylindrical sector electrode surfaces, and further wherein the second array of circular segment electrodes includes at least two circular segment electrodes evenly spaced between the lower edges of the first and second cylindrical sector electrode surfaces.

14. The apparatus of claim 13, wherein the apparatus further includes a voltage supply circuit for applying a predetermined voltage to each of the first and second cylindrical sector electrode surfaces and to each of the circular segment electrodes of the first and second electrode arrays.

15. The apparatus of claim 14, wherein the voltage supply circuit includes a first resistor network formed on a side of the first substrate portion opposite the first array of electrodes and a second resistor network formed on a side of the second substrate portion opposite the second array of electrodes.

16. The apparatus of claim 14, wherein the predetermined voltage applied varies logarithmically across the first and second array of electrodes.

17. The apparatus of claim 14, wherein the voltage supply circuit includes a voltage divider network of logarithmically varying resistors.

18. The apparatus of claim 12, wherein the first array of circular segment electrodes includes at least two circular segment electrodes logarithmically spaced between the upper edges of the first and second cylindrical sector electrode surfaces, and further wherein the second array of circular segment electrodes includes at least two circular segment electrodes logarithmically spaced between the lower edges of the first and second cylindrical sector electrode surfaces.

19. The apparatus of claim 18, wherein the apparatus further includes a voltage supply circuit for applying a predetermined voltage to each of the first and second cylindrical sector electrode surfaces and to each of the circular segment electrodes of the first and second electrode arrays.

20. The apparatus of claim 19, wherein the voltage supply circuit includes a first resistor network formed on a side of the first substrate portion opposite the first array of electrodes and a second resistor network formed on a side of the second substrate portion opposite the second array of electrodes.

21. The apparatus of claim 19, wherein the voltage supply circuit includes a voltage divider network of equally valued resistors connected across each of the first and second arrays of electrodes.

22. A double-focusing mass spectrometer apparatus comprising:

two or more substrate portions positioned to define an ion path having superimposed magnetic and electric fields provided therein, wherein a first substrate portion includes a first array of electrodes formed on one side thereof defined radially from an axis and wherein a second substrate portion includes a second array of electrodes formed on a side thereof defined radially from the axis, the first and second arrays of electrodes are positioned generally parallel to one another for use in providing the electric field in the ion path; and a first and second magnet pole located proximate the two or more substrate portions for providing the magnetic field in the ion path orthogonal to the electric field, wherein the first and second arrays of electrodes are configured as a function of the magnetic field such that a desired ratio of magnetic field to electric field is attained in substantially the entire ion path such that mass selection using the mass spectrometer is achieved independent of ion velocity.

23. The apparatus of claim 22, wherein the first and second arrays of electrodes are spaced as a function of the magnetic field such that a desired ratio of magnetic field to electric field is attained in substantially the entire ion path.

24. The apparatus of claim 22, wherein the first and second arrays of electrodes are shaped as a function of the magnetic field such that a desired ratio of magnetic field to electric field is attained in substantially the entire ion path.

25. The apparatus of claim 22, wherein the first and second arrays of electrodes are deposited on a surface of ceramic substrates.

26. A double-focusing mass spectrometry method, the method comprising:

providing a first cylindrical sector electrode surface defined at a first radial distance from an axis, wherein the first cylindrical sector electrode surface has an upper and lower edge;

providing a second cylindrical sector electrode surface defined at a second radial distance from the axis, wherein the second cylindrical sector electrode has an upper and lower edge corresponding to the upper and lower edge of the first cylindrical sector electrode, and further wherein an ion path is defined between the first and second cylindrical sector electrode surfaces;

generating a magnetic field in the ion path; and generating a desired electric field in the ion path perpendicular to the magnetic field using a first array of electrodes positioned between the upper edges of the first and second cylindrical sector surfaces, a second array of electrodes positioned between the lower edges of the first and second cylindrical sector surfaces, and the first and second cylindrical sector electrode surfaces, wherein the first array of electrodes includes at least two circular segment electrodes evenly spaced between the upper edges of the first and second cylindrical sector electrode surfaces, wherein the second array of electrodes includes at least two circular segment electrodes evenly spaced between the lower edges of the first and second cylindrical sector electrode surfaces, and further wherein generating the desired electric field in the ion path perpendicular to the magnetic field includes:

applying a voltage to each of the electrodes of the first array of electrodes, wherein the voltages applied to the first array of electrodes vary logarithmically from electrode to electrode from the first cylindrical sector electrode surface across the first array of electrodes to the second cylindrical sector electrode surface, and applying a voltage to each of the electrodes of the second array of electrodes, wherein the voltages applied to the second array of electrodes vary logarithmically from electrode to electrode from the first cylindrical sector electrode surface across the second array of electrodes to the second cylindrical sector electrode surface.

27. The method of claim 26, wherein applying the voltage to each electrode of the first and second arrays of electrodes includes connecting a logarithmically varying resistor network across each of the first and second electrode arrays.

28. A double-focusing mass spectrometry method, the method comprising:

providing a first cylindrical sector electrode surface defined at a first radial distance from an axis, wherein the first cylindrical sector electrode surface has an upper and lower edge;

providing a second cylindrical sector electrode surface defined at a second radial distance from the axis, wherein the second cylindrical sector electrode has an upper and lower edge corresponding to the upper and lower edge of the first cylindrical sector electrode, and further wherein an ion path is defined between the first and second cylindrical sector electrode surfaces;

generating a magnetic field in the ion path; and generating a desired electric field in the ion path perpendicular to the magnetic field using a first array of electrodes positioned between the upper edges of the first and second cylindrical sector surfaces, a second array of electrodes positioned between the lower edges of the first and second cylindrical sector surfaces, and the first and second cylindrical sector electrode surfaces, wherein the first array of electrodes includes at least two circular segment electrodes logarithmically spaced between the upper edges of the first and second cylindrical sector electrode surfaces, wherein the second array of electrodes includes at least two circular segment electrodes logarithmically spaced between the lower edges of the first and second cylindrical sector electrode surfaces, and further wherein generating the desired electric field in the ion path perpendicular to the magnetic field includes applying a predetermined voltage to each of the first and second cylindrical sector electrode surfaces and to each of the logarithmically spaced circular segment electrode of the first and second electrode arrays.

29. The method of claim 28, wherein generating the electric field includes connecting equally valued resistors between adjacent logarithmically spaced electrodes of the first and second arrays of electrodes.

30. A double-focusing mass spectrometry method, the method comprising:

providing a first cylindrical sector electrode surfaces defined at a first radial distance from an axis, wherein the first cylindrical sector electrode surface has an upper and lower edge;

providing a second cylindrical sector electrode surface defined at a second radial distance from the axis, wherein the second cylindrical sector electrode has an upper and lower edge corresponding to the upper and lower edge of the first cylindrical sector electrode, and further wherein an ion path is defined between the first and second cylindrical sector electrode surfaces;

generating a magnetic field in the ion path; and generating a desired electric field in the ion path perpendicular to the magnetic field using a first array of electrodes positioned between the upper edges of the first and second cylindrical sector surfaces, a second array of electrodes positioned between the lower edges of the first and second cylindrical sector surfaces, and the first and second cylindrical sector electrode surfaces, wherein generating the desired electric field in the ion path perpendicular to the magnetic field includes configuring the first and second arrays of electrodes as a function of the magnetic field in the ion path such that a desired ratio of magnetic field to electric field is attained in substantially the entire ion path such that mass selection using the mass spectrometer is achieved independent of ion velocity.

31. The method of claim 30, wherein configuring the first and second arrays of electrodes includes spacing the first and second array of electrodes as a function of the magnetic field in the ion path such that a desired ratio of magnetic field to electric field is attained in substantially the entire ion path.

32. The method of claim 30, wherein configuring the first and second arrays of electrodes includes shaping the first and second array of electrodes as a function of the magnetic field in the ion path such that a desired ratio of magnetic field to electric field is attained in substantially the entire ion path.

33. A method for use in double focusing mass spectrometer apparatus, the method comprising:

providing a non-uniform magnetic field for an ion path of a double focusing mass spectrometer; and forming an electrode assembly to provide an electric field in the ion path, wherein forming the electrode assembly includes forming two or more electrodes to a particular configuration as a function of the non-uniformity of the magnetic field such that the electric field in the entire ion path in the double focusing mass spectrometer is at a predetermined ratio to the magnetic field.

34. The method of claim 33, wherein forming the two or more electrodes includes configuring a first and second array of electrodes positioned generally parallel to one another as a function of the non-uniformity of the magnetic field.

35. The method of claim 34, wherein configuring the first and second arrays of electrodes includes spacing electrodes of the first and second array of electrodes as a function of the non-uniformity of the magnetic field.

36. The method of claim 34, wherein configuring the first and second arrays of electrodes includes shaping electrodes of the first and second array of electrodes as a function of the non-uniformity of the magnetic field.

37. A double focusing mass spectrometry method comprising:

sealing two or more substrate portions together to define an ion path, wherein a first substrate portion includes a first array of electrodes formed on a side thereof and wherein a second substrate portion includes a second array of electrodes formed on a side thereof, and further wherein sealing the two or more substrate portions together includes positioning the first and second arrays of electrodes generally parallel to one another;

generating an electric field in the ion path using at least the first and second arrays of electrodes, wherein the electric field has a cylindrical geometry; and positioning a first and second magnet pole proximate the two or more substrate portions for providing a magnetic field in the ion path orthogonal to and superimposed with the electric field in the ion path.

38. The method of claim 37, wherein a radial distance along which the first and second array of electrodes are defined is greater than about 10 times a distance in the direction of the axis between the parallel first and second arrays of electrodes.

39. The method of claim 37, wherein the first and second array of electrode includes a first and second array of circular segment electrodes, and further wherein the method includes:

providing a first cylindrical sector electrode surface defined at a first radial distance from a cylindrical axis, the first cylindrical sector electrode surface having an upper and lower edge; and providing a second cylindrical sector electrode surface defined at a second radial distance from the cylindrical axis, the second cylindrical sector electrode surface having an upper and lower edge corresponding to the upper and lower edge of the first cylindrical sector electrode surface, the ion path defined between the first and second cylindrical sector electrode surfaces; and further wherein sealing the first and second substrate portions together includes positioning the first array of circular segment electrodes between the upper edges of the first and second cylindrical sector surfaces and positioning the second array of circular segment electrodes between the lower edges of the first and second cylindrical sector surfaces.

40. The method of claim 39, wherein positioning the first array of circular segment electrodes includes evenly spacing the circular segment electrodes between the upper edges of the first and second cylindrical sector electrode surfaces, wherein positioning the second array of circular segment electrodes includes evenly spacing the circular segment electrodes between the lower edges of the first and second cylindrical sector electrode surfaces, and further wherein the method includes applying predetermined voltages to each of the first and second cylindrical sector electrode surfaces and to each of the circular segment electrodes of the first and second electrode arrays.

41. The method of claim 40, wherein applying the predetermined voltages includes forming a first resistor network on a side of the first substrate portion opposite the first array of circular segment electrodes and forming a second resistor network on a side of the second substrate portion opposite the second array of circular segment electrodes.

42. The method of claim 40, wherein applying the predetermined voltages includes applying logarithmically varying voltages across each of the first and second array of electrodes.

43. The method of claim 40, wherein applying the predetermined voltages includes connecting a network of logarithmically varying resistors across each of the first and second arrays of circular segment electrodes.

44. The method of claim 39, wherein the first array of circular segment electrodes includes at least two circular segment electrodes logarithmically spaced between the upper edges of the first and second cylindrical sector electrode surfaces, wherein the second array of electrodes includes at least two circular segment electrodes logarithmically spaced between the lower edges of the first and second cylindrical sector electrode surfaces, and further wherein the method includes applying predetermined voltages to each of the first and second cylindrical sector electrode surfaces and to each of the circular segment electrodes of the first and second electrode arrays.

45. The method of claim 44, wherein applying the predetermined voltages includes forming a first network of resistors having equal values on a side of the first substrate portion opposite the first array of circular segment electrodes and forming a second network of resistors having equal values on a side of the second substrate portion opposite the second array of circular segment electrodes.

46. The method of claim 44, wherein applying the predetermined voltages includes connecting a resistor network of equally valued resistors across each of the first and second arrays of electrodes.

47. The method of claim 37, wherein the method further includes configuring the first and second arrays of electrodes as a function of the magnetic field such that a desired ratio of magnetic field to electric field is attained in substantially the entire ion path.

48. The method of claim 47, wherein configuring the first and second arrays of circular segment electrodes includes spacing the first and second arrays of circular segment electrodes as a function of the magnetic field such that a desired ratio of magnetic field to electric field is attained in substantially the entire ion path.

49. The method of claim 47, wherein configuring the first and second arrays of circular segment electrodes includes shaping the first and second arrays of circular segment electrodes as a function of the magnetic field such that a desired ratio of magnetic field to electric field is attained in substantially the entire ion path.

50. The method of claim 37, wherein the method further includes depositing the first and second arrays of electrodes on a surface of ceramic substrates.

* * * * *